(12) United States Patent
Yonezawa et al.

(10) Patent No.: US 10,168,514 B2
(45) Date of Patent: Jan. 1, 2019

(54) ZOOM LENS AND IMAGING APPARATUS

(71) Applicant: FUJIFILM Corporation, Tokyo (JP)

(72) Inventors: Masaru Yonezawa, Saitama (JP);
Takuya Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/843,254

(22) Filed: Dec. 15, 2017

(65) Prior Publication Data

US 2018/0188510 A1 Jul. 5, 2018

(30) Foreign Application Priority Data

Jan. 5, 2017 (JP) ................................. 2017-000494

(51) Int. Cl.
*G02B 15/14* (2006.01)
*G02B 15/167* (2006.01)
*G02B 15/20* (2006.01)

(52) U.S. Cl.
CPC .......... *G02B 15/167* (2013.01); *G02B 15/20* (2013.01)

(58) Field of Classification Search
CPC ...................................... G02B 15/20
USPC ......................................... 359/686
See application file for complete search history.

(56) References Cited

U.S. PATENT DOCUMENTS

2010/0165476 A1\* 7/2010 Eguchi ............... G02B 13/04
359/680

FOREIGN PATENT DOCUMENTS

JP 2015-022146 A 2/2015
JP 5893487 B2 3/2016

\* cited by examiner

*Primary Examiner* — James Jones
(74) *Attorney, Agent, or Firm* — Studebaker & Brackett PC

(57) ABSTRACT

The zoom lens consists of, in order from the object side, a first lens group that has a positive refractive power and remains stationary during zooming, a plurality of movable lens groups that move during zooming, and a final lens group that has a positive refractive power and remains stationary during zooming. The first lens group consists of, in order from the object side, a first lens group front group that has a negative refractive power and remains stationary during focusing, a first lens group intermediate group that has a positive refractive power and moves during focusing, and a first lens group rear group that has a positive refractive power. The first lens group front group has, successively in order from a position closest to the object side, a negative meniscus lens that is concave toward the image side and a negative lens.

20 Claims, 11 Drawing Sheets

EXAMPLE 1

EXAMPLE 1

EXAMPLE 2

EXAMPLE 3

EXAMPLE 4

EXAMPLE 5

EXAMPLE 1

EXAMPLE 2

EXAMPLE 4

EXAMPLE 5

ZOOM LENS AND IMAGING APPARATUS

CROSS-REFERENCE TO RELATED APPLICATIONS

The present application claims priority under 35 U.S.C. § 119 to Japanese Patent Application No. 2017-000494, filed on Jan. 5, 2017. The above application is hereby expressly incorporated by reference, in its entirety, into the present application.

BACKGROUND OF THE INVENTION

1. Field of the Invention

The present invention relates to a zoom lens suitable for electronic cameras such as movie imaging cameras, broadcast cameras, digital cameras, video cameras, and surveillance cameras, and to an imaging apparatus comprising the zoom lens.

2. Description of the Related Art

In the related art, a zoom lens having a four-group configuration or a five-group configuration is used as a lens system that can be used for cameras in the above-mentioned fields. For movie imaging cameras and broadcast cameras, the change in the total length of the lens system due to zooming and the change in the angle of view caused by focusing are undesirable. Therefore, in most cases, the first lens group, which is a lens group closest to the object side in the zoom lens, is made to remain stationary during zooming, and focusing is performed by moving the lenses in the first lens group during focusing. As such a zoom lens, for example, those described in JP2015-22146A and JP5893487B are known.

SUMMARY OF THE INVENTION

In imaging apparatuses such as movie imaging cameras and broadcast cameras, there is a demand for a zoom lens that is compact and lightweight but has favorable optical performance. In particular, reduction in size and reduction in weight are strongly demanded for imaging modes focusing on maneuverability and operability. Meanwhile, there is also a demand for cameras in the above-mentioned field to be capable of performing imaging with a wide angle of view. However, as the angle of view of the zoom lens increases, the diameter of the lens closest to the object side (hereinafter referred to as the front lens) tends to become large, and it is not easy to achieve both wide angle and reduction in size.

In the lens system described in JP2015-22146A, study about the refractive index of the front lens and the configuration of the lens groups moving during zooming has progressed. However, in order to sufficiently respond to the reduction in size demanded in recent years, it is preferable that the diameter of the front lens is set to be small, and it is more preferable that reduction in size is achieved. The lens system described in JP5893487B also has a large diameter of the front lens, and thus it is difficult to say that reduction in size thereof is sufficient.

The present invention has been made in consideration of the above-mentioned situations, it is an object of the present invention to provide a zoom lens, for which reduction in size and weight is achieved while wide angle is achieved and which has high optical performance throughout the entire zoom range, and an imaging apparatus comprising the zoom lens.

A zoom lens of the present invention consists of, in order from an object side: a first lens group that has a positive refractive power and remains stationary with respect to an image plane during zooming; a plurality of movable lens groups that move by changing distances in a direction of an optical axis between groups adjacent to each other during zooming; and a final lens group that has positive refractive power and remains stationary with respect to the image plane during zooming. The first lens group consists of, in order from the object side, a first lens group front group that has a negative refractive power and remains stationary with respect to the image plane during focusing, a first lens group intermediate group that has a positive refractive power and moves in the direction of the optical axis during focusing, and a first lens group rear group that is set such that a distance in the direction of the optical axis between the first lens group rear group and the first lens group intermediate group changes during focusing and has a positive refractive power. The first lens group front group has, successively in order from a position closest to the object side, a negative meniscus lens that is concave toward an image side, and a negative lens. Conditional Expression (1) is satisfied.

$$1.84 < Naven \tag{1}$$

Here, Naven is an average value of refractive indices of negative lenses in the first lens group front group at a d line.

It is preferable that Conditional Expression (1-1) is satisfied.

$$1.85 < Naven < 1.96 \tag{1-1}$$

It is preferable that Conditional Expression (2) is satisfied, and it is more preferable that Conditional Expression (2-1) is satisfied.

$$-3 < f1c/f1a < -1.25 \tag{2}$$

$$-2.5 f1c/f1a < -1.35 \tag{2-1}$$

Here, f1c is a focal length of the first lens group rear group, and f1a is a focal length of the first lens group front group.

It is preferable that the first lens group front group has a positive lens at a position closest to the image side. It is preferable that Conditional Expression (3) is satisfied, and it is more preferable that Conditional Expression (3-1) is satisfied.

$$10 < vaven - vavep < 20 \tag{3}$$

$$11 < vaven - vavep < 18 \tag{3-1}$$

Here, vaven is an average value of Abbe numbers of the negative lenses in the first lens group front group at the d line, and vavep is an average value of Abbe numbers of positive lenses in the first lens group front group at the d line.

It is preferable that Conditional Expression (4) is satisfied, and it is more preferable that Conditional Expression (4-1) is satisfied.

$$1.5 < (R1+R2)/(R1-R2) < 3.5 \tag{4}$$

$$1.8 < (R1+R2)/(R1-R2) < 3.3 \tag{4-1}$$

Here, R1 is a radius of curvature of an object side surface of the negative meniscus lens closest to the object side in the first lens group front group, and R2 is a radius of curvature of an image side surface of the negative meniscus lens closest to the object side in the first lens group front group.

It is preferable that Conditional Expression (5) is satisfied, and it is more preferable that Conditional Expression (5-1) is satisfied.

$$-2.5 < f1/f1a < -1.0 \quad (5)$$

$$-2.2 < f1/f1a < -1.1 \quad (5-1)$$

Here, fl is a focal length of the first lens group in a state where the object at infinity is in focus, and fla is a focal length of the first lens group front group.

It is preferable that Conditional Expression (6) is satisfied, and it is more preferable that Conditional Expression (6-1) is satisfied.

$$-0.4 < f1a/f1b < -0.1 \quad (6)$$

$$-0.35 < f1a/f1b < -0.11 \quad (6-1)$$

Here, fla is a focal length of the first lens group front group, and flb is a focal length of the first lens group intermediate group.

The first lens group front group may be configured to consist of, in order from the object side, a negative meniscus lens that is concave toward the image side, a negative lens, and a positive lens.

In the plurality of movable lens groups, a movable lens group closest to the object side may be configured to have a positive refractive power.

It is preferable that the first lens group rear group consists of, in order from the object side, a cemented lens which is formed by cementing a negative lens and a positive lens in order from the object side, and a positive lens.

In the plurality of movable lens groups, a movable lens group closest to the image side may be configured to have a negative refractive power. In this case, the plurality of movable lens groups may be configured to consist of, in order from the object side, a lens group having a positive refractive power, a lens group having a negative refractive power, and a lens group having a negative refractive power.

Alternatively, in the plurality of movable lens groups, a movable lens group closest to the image side may be configured to have a positive refractive power. In this case, the plurality of movable lens groups may be configured to consist of, in order from the object side, a lens group having a positive refractive power, a lens group having a negative refractive power, and a lens group having a positive refractive power.

An imaging apparatus of the present invention comprises the zoom lens of the present invention.

In the present description, it should be noted that the terms "consisting of ~" and "consists of ~" mean that the zoom lens may include not only the above-mentioned elements but also lenses substantially having no powers, optical elements, which are not lenses, such as a stop, a filter, and a cover glass, and mechanism parts such as a lens flange, a lens barrel, an imaging element, and a hand shaking correction mechanism.

In addition, the term "~ group that has a positive refractive power" means that the group has a positive refractive power as a whole. It is the same for the term "~ group that has a negative refractive power". The "group" is not necessarily composed of a plurality of lenses, but may be composed of only one lens. Reference signs of refractive powers of the groups, reference signs of refractive powers of the lenses, surface shapes of the lenses, and radii of curvature of surfaces of the lenses are assumed as those in paraxial regions in a case where some lenses have aspheric surfaces. Reference signs of radii of curvature of surface shapes convex toward the object side are set to be positive, and reference signs of radii of curvature of surface shapes convex toward the image side are set to be negative. The "negative meniscus lens" is a lens that has a negative refractive power and has a meniscus shape. All the above-mentioned conditional expressions are based on the d line (a wavelength of 587.56 nm (nanometers)).

According to the present invention, the zoom lens consists of, in order from the object side, a first lens group that has a positive refractive power and remains stationary during zooming, a plurality of movable lens groups that move during zooming, and a final lens group that has a positive refractive power and remains stationary during zooming. By suitably setting a configuration of the first lens group and performing setting such that predetermined conditional expressions are satisfied, it is possible to provide a zoom lens for which reduction in size and weight is achieved with wide angle and which has high optical performance throughout the entire zooming range, and an imaging apparatus comprising the zoom lens.

DESCRIPTION OF THE PREFERRED EMBODIMENTS

Figure 1:
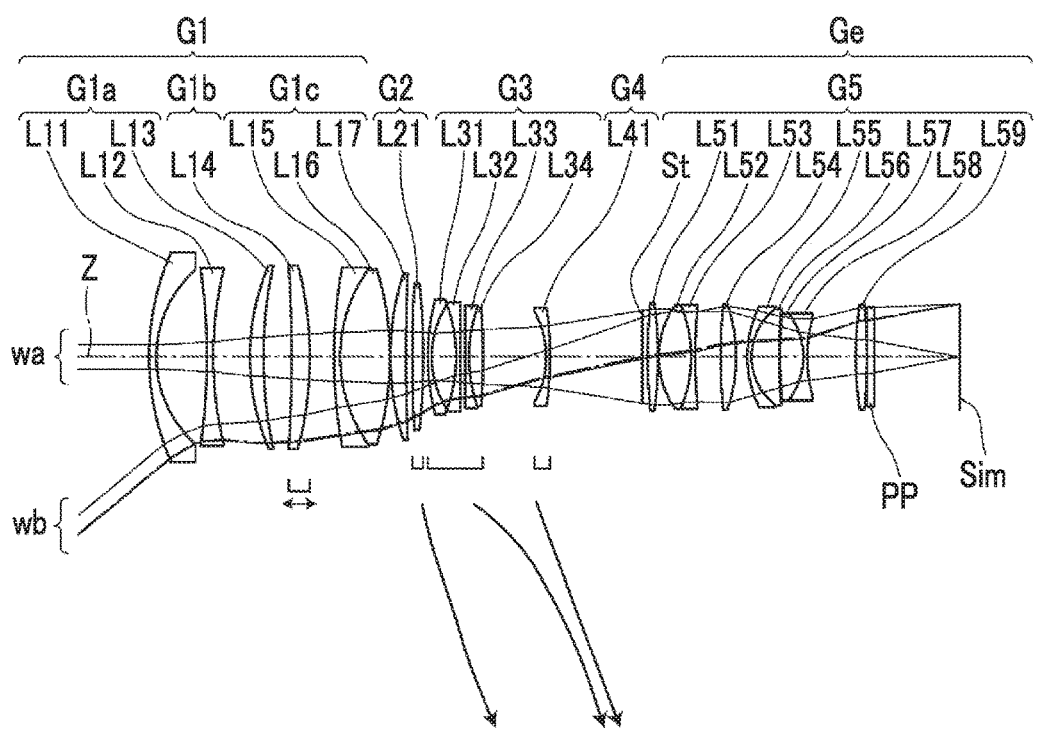
FIG. 1 is a cross-sectional view illustrating a configuration and an optical path of a zoom lens according to Example 1 of the present invention, where the upper part thereof shows the zoom lens in a wide-angle end state and the lower part thereof shows the zoom lens in a telephoto end state.
Figure 1:
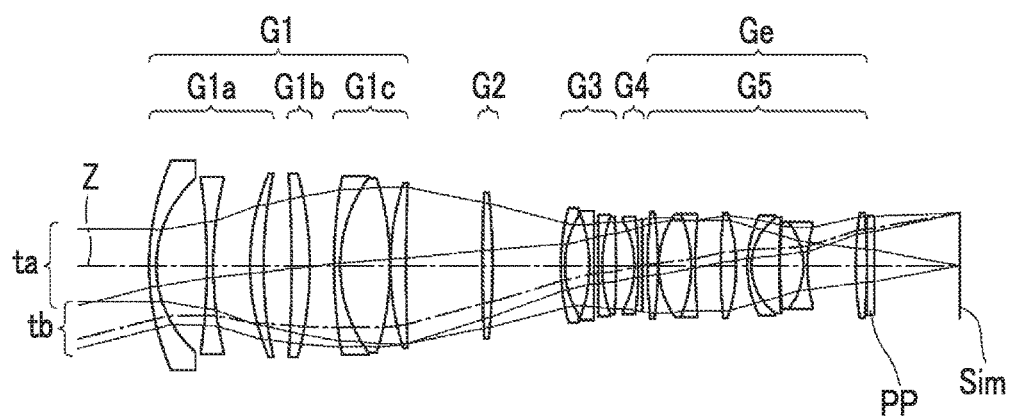

Hereinafter, embodiments of the present invention will be described with reference to drawings. FIG. 1 is a cross-sectional view illustrating a lens configuration and an optical path of a zoom lens according to an embodiment of the present invention. In FIG. 1, aberrations in the wide-angle end state are shown in the upper part indicated by "WIDE", on-axis rays wa and rays with the maximum angle of view wb are shown as rays. In addition, aberrations in the telephoto end state are shown in the lower part indicated by "TELE", and on-axis rays ta and rays with the maximum angle of view tb are shown as rays. It should be noted that the example shown in FIG. 1 corresponds to the zoom lens of Example 1 to be described later. FIG. 1 shows a state where the object at infinity is in focus, where the left side of the drawing is the object side and the right side of the drawing is the image side.

In order to mount the zoom lens on an imaging apparatus, it is preferable to provide various filters and/or a protective cover glass based on specification of the imaging apparatus. Thus, FIG. 1 shows an example where a plane-parallel-plate-like optical member PP, in which those are considered, is disposed between the lens system and the image plane Sim. However, a position of the optical member PP is not limited to that shown in FIG. 1, and it is also possible to adopt a configuration in which the optical member PP is omitted.

The zoom lens consists of, in order from the object side to the image side along the optical axis Z: a first lens group G1 that has a positive refractive power and remains stationary with respect to the image plane Sim during zooming; a plurality of movable lens groups that move by changing distances in a direction of an optical axis between groups adjacent to each other during zooming; and a final lens group Ge that has positive refractive power and remains stationary with respect to the image plane Sim during zooming.

The zoom lens of the example shown in FIG. 1 consists of, in order from the object side to the image side along the optical axis Z, the first lens group G1, a second lens group G2, a third lens group G3, a fourth lens group G4, and a fifth lens group G5. During zooming, the first lens group G1 and the fifth lens group G5 remain stationary with respect to the image plane Sim, the second lens group G2, the third lens group G3, and the fourth lens group G4 move by changing mutual distances in the direction of the optical axis. In the example shown in FIG. 1, the second lens group G2, the third lens group G3, and the fourth lens group G4 each correspond to the movable lens group, and the fifth lens group G5 corresponds to the final lens group Ge. In the drawing of the upper part of FIG. 1, arrows, each of which schematically indicates a direction of movement of each lens group during zooming from the wide-angle end to the telephoto end, are shown below the second lens group G2, the third lens group G3, and the fourth lens group G4, respectively.

In the example shown in FIG. 1, the first lens group G1 consists of, in order from the object side, a total of seven lenses L11 to L17, the second lens group G2 consists of one lens L21, the third lens group G3 consists of four lenses L31 to L34 in order from the object side, the fourth lens group G4 consists of one lens L41, the fifth lens group G5 consists of, in order from the object side, an aperture stop St, and nine lenses L51 to L59. However, in the present invention, the number of movable lens groups disposed between the first lens group G1 and the final lens group Ge may be different from that in the example of FIG. 1, and the number of lenses constituting each lens group may be different from that in the example shown in FIG. 1, and the aperture stop St may be disposed at a position different from that in the example shown in FIG. 1. Further, the aperture stop St shown in FIG. 1 does not necessarily indicate its sizes and/or shapes, and indicates a position of the aperture stop St on the optical axis Z.

In this zoom lens, by forming the first lens group G1 closest to the object side as a positive lens group, it is possible to shorten the total length of the lens system, and thus there is an advantage in reduction in size. Further, by forming the final lens group Ge closest to the image side as the positive lens group, it is possible to suppress an increase in incident angle of the principal ray of the off-axis rays incident onto the image plane Sim. As a result, it is possible to suppress shading. In addition, by adopting a configuration in which the lens group closest to the object side and the lens group closest to the image side remain stationary during zooming, it is possible to make the total length of the lens system unchanged during zooming.

The first lens group G1 consists of, in order from the object side, a first lens group front group G1a that has a negative refractive power and remains stationary with respect to the image plane Sim during focusing, a first lens group intermediate group G1b that has a positive refractive power and moves in the direction of the optical axis during focusing, and a first lens group rear group G1c that is set such that a distance in the direction of the optical axis between the first lens group rear group G1c and the first lens group intermediate group G1b changes during focusing and has a positive refractive power. With such a configuration, it becomes easy to suppress change in the angle of view caused by focusing. In FIG. 1, both arrows below the first lens group intermediate group G1b indicate that the first lens group intermediate group G1b is movable in the directions of the optical axis during focusing.

In addition, the first lens group rear group G1c may remain stationary with respect to the image plane Sim during focusing. In such a case, the lens groups, which move during focusing, can be formed of only the first lens group intermediate group G1b, and it is possible to simplify the focusing mechanism. Thus, it is possible to suppress an increase in size of the apparatus. Alternatively, the first lens group rear group G1c may move in the direction of the optical axis along a locus different from that of the first lens group intermediate group G1b during focusing. In such a case, it is possible to suppress fluctuation in aberration during focusing.

The first lens group front group G1a has, successively in order from the position closest to the object side, a lens L11, which is a negative meniscus lens concave toward the image side, and a lens L12 which is a negative lens. With this configuration, it is possible to obtain a negative refractive power necessary for achieving wide angle while suppressing occurrence of astigmatism.

The first lens group front group G1a may be configured to consist of, in order from the object side, a negative meniscus lens that is concave toward the image side, a negative lens, and a positive lens. In such a case, aberration correction of the first lens group front group G1a, in particular, correction of chromatic aberration can be satisfactorily performed. Alternatively, the first lens group front group G1a may be configured to consist of, in order from the object side, a negative meniscus lens concave toward the image side, a negative lens, a negative lens, and a positive lens.

The lens closest to the image side in the first lens group front group G1a may be a positive meniscus lens concave toward the image side. In such a case, it is possible to suppress occurrence of astigmatism on the wide-angle side, and there is an advantage in correction of spherical aberration on the telephoto side.

For example, the first lens group intermediate group G1b may be configured to consist of only one lens. In such a case, it is possible to reduce the load on the focusing mechanism. In the example of FIG. 1, the first lens group intermediate group G1b consists of one positive lens.

The first lens group rear group G1c may be configured to consist of, in order from the object side, a cemented lens which is formed by cementing a negative lens and a positive lens in order from the object side, and a positive lens. In such a case, it becomes easy to correct chromatic aberration of the first lens group G1 and correct spherical aberration on the telephoto side.

The zoom lens is configured to satisfy Conditional Expression (1).

$$1.84 < Naven \tag{1}$$

Here, Naven is an average value of refractive indices of negative lenses in the first lens group front group G1a at the d line.

By satisfying Conditional Expression (1), it becomes easy to secure a negative refractive power necessary for achieving wide angle and reducing the size of the first lens group front group G1a. Alternatively, by satisfying Conditional Expression (1), the absolute value of the radius of curvature of the negative lens in the first lens group front group G1a can be prevented from becoming excessively small. As a result, it becomes easy to correct higher order aberrations. It should be noted that the term "high order" described herein means 5th or more order.

It is preferable that Conditional Expression (1-1) is satisfied.

$$1.85 < Naven < 1.96 \tag{1-1}$$

By not allowing the result of Conditional Expression (1-1) to be equal to or less than the lower limit, it is possible to increase an effect of Conditional Expression (1). In general, as the refractive index increases, the specific gravity increases and the Abbe number decreases. By not allowing the result of Conditional Expression (1-1) to be equal to or greater than the upper limit, it is possible to prevent the lens weight of the first lens group front group G1a from increasing, and there is an advantage in correction of lateral chromatic aberration on the wide-angle side.

It is preferable that the zoom lens satisfies Conditional Expression (2).

$$-3 < flc/fla < -1.25 \tag{2}$$

Here, flc is a focal length of the first lens group rear group G1c, and fla is a focal length of the first lens group front group G1a.

By not allowing the result of Conditional Expression (2) to be equal to or less than the lower limit, a negative refractive power of the first lens group front group G1a is prevented from becoming excessively stronger. Thus, it is possible to correct field curvature and distortion at the wide-angle end. Further, it is possible to suppress the increase in the size of the first lens group rear group G1c and to easily correct spherical aberration on the telephoto side. By not allowing the result of Conditional Expression (2) to be equal to or greater than the upper limit, a negative refractive power of the first lens group front group G1a is prevented from becoming excessively weaker. Thus, it becomes easy to achieve wide angle and reduction in size of the first lens group front group G1a. In order to enhance the effect relating to Conditional Expression (2), it is more preferable that Conditional Expression (2-1) is satisfied.

$$-2.5 < flc/fla < -1.35 \tag{2-1}$$

It is preferable that the first lens group front group G1a has a positive lens at a position closest to the image side and Conditional Expression (3) is satisfied.

$$10 < vaven - vavep < 20 \tag{3}$$

Here, vaven is an average value of Abbe numbers of the negative lenses in the first lens group front group G1a at the d line, and vavep is an average value of Abbe numbers of positive lenses in the first lens group front group G1a at the d line.

The first lens group front group G1a has a positive lens closest to the image side, and thus there is an advantage in correction of spherical aberration on the telephoto side. By not allowing the result of Conditional Expression (3) to be equal to or less than the lower limit, it is possible to prevent lateral chromatic aberration at the wide-angle end from being overcorrected. By not allowing the result of Conditional Expression (3) to be equal to or greater than the upper limit, it is possible to prevent lateral chromatic aberration at the wide-angle end from becoming insufficiently corrected. In order to enhance the effect relating to Conditional Expression (3), it is more preferable that Conditional Expression (3-1) is satisfied.

$$11 < vaven - vavep < 18 \tag{3-1}$$

It is preferable that the zoom lens satisfies Conditional Expression (4).

$$1.5<(R1+R2)/(R1-R2)<3.5 \qquad (4)$$

Here, R1 is a radius of curvature of an object side surface of the negative meniscus lens closest to the object side in the first lens group front group G1a, and R2 is a radius of curvature of an image side surface of the negative meniscus lens closest to the object side in the first lens group front group G1a.

By not allowing the result of Conditional Expression (4) to be equal to or less than the lower limit, it becomes easy to correct barrel-like distortion at the wide-angle end. By not allowing the result of Conditional Expression (4) to be equal to or greater than the upper limit, a shape of the lens L11, which is closest to the object side and has a meniscus shape of which the object side surface is convex surface and of which image side surface is a concave surface, can be formed such that the difference in radius of curvature between the object side surface and the image side surface is prevented from becoming excessively small. Thus, a negative refractive power of the lens can be prevented from becoming excessively weak. As a result, there is an advantage in achieving wide angle. In order to enhance the effect relating to Conditional Expression (4), it is more preferable that Conditional Expression (4-1) is satisfied.

$$1.8<(R1+R2)/(R1-R2)<3.3 \qquad (4-1)$$

It is preferable that the zoom lens satisfies Conditional Expression (5)

$$-2.5<fl/fla<-1.0 \qquad (5)$$

Here, fl is a focal length of the first lens group G1 in a state where the object at infinity is in focus, and fla is a focal length of the first lens group front group G1a.

By not allowing the result of Conditional Expression (5) to be equal to or less than the lower limit, a negative refractive power of the first lens group front group G1a is prevented from becoming excessively stronger. Thus, it is possible to correct field curvature and distortion at the wide-angle end. Further, the negative refractive power of the first lens group front group G1a is prevented from becoming excessively stronger. Thus, the first lens group intermediate group G1b and the first lens group rear group G1c can be prevented from increasing in size. By not allowing the result of Conditional Expression (5) to be equal to or greater than the upper limit, a negative refractive power of the first lens group front group G1a is prevented from becoming excessively weaker. Thus, it becomes easy to achieve wide angle and reduction in size of the first lens group front group G1a, in order to enhance the effect relating to Conditional Expression (5), it is more preferable that Conditional Expression (5-1) is satisfied.

$$-2.2<fl/fla<-1.1 \qquad (5-1)$$

It is preferable that the zoom lens satisfies Conditional Expression (6).

$$-0.4<fla/flb<-0.1 \qquad (6)$$

Here, fla is a focal length of the first lens group front group G1a, and flb is a focal length of the first lens group intermediate group G1b.

By not allowing the result of Conditional Expression (6) to be equal to or less than the lower limit, it is possible to secure a refractive power of the first lens group front group G1a. Therefore, the angle of the off-axis principal my incident into the first lens group intermediate group G1b can be prevented from becoming excessively large. As a result, it is possible to suppress fluctuations in image plane and lateral chromatic aberration caused by focusing on the wide-angle side. By not allowing the result of Conditional Expression (6) to be equal to or greater than the upper limit, the refractive power of the first lens group front group G1a is prevented from becoming excessively strong. Thus, the first lens group intermediate group G1b and the first lens group rear group G1c can be prevented from increasing in size. In order to enhance the effect relating to Conditional Expression (6), it is more preferable that Conditional Expression (6-1) is satisfied.

$$-0.35<fla/flb<-0.11 \qquad (6-1)$$

In the zoom lens, in the plurality of movable lens groups disposed between the first lens group G1 and the final lens group Ge, it is preferable that in the plurality of movable lens groups, a movable lens group closest to the object side has a positive refractive power. In such a case, it is possible to satisfactorily correct distortion at the wide-angle end.

In the plurality of movable lens groups, a movable lens group closest to the image side may be configured to have a negative refractive power. In such a case, the stroke of movement during zooming becomes small, and thus it is possible to shorten the total length of the lens system. For example, the plurality of movable lens groups may be configured to consist of, in order from the object side, a lens group having a positive refractive power, a lens group having a negative refractive power, and a lens group having a negative refractive power. In such a case, by satisfactorily correcting distortion at the wide-angle end, the stroke of movement during zooming becomes small, and thus it is possible to shorten the total length of the lens system.

Alternatively, in the plurality of movable lens groups, a movable lens group closest to the image side may be configured to have a positive refractive power. In such a case, the height of rays entering the final lens group Ge becomes low, and thus there is an advantage in reduction in size. For example, the plurality of movable lens groups may be configured to consist of, in order from the object side, a lens group having a positive refractive power, a lens group having a negative refractive power, and a lens group having a positive refractive power. In such a case, distortion at the wide-angle end is satisfactorily corrected, and thus there is an advantage in reduction in size of the final lens group Ge.

Alternatively, the plurality of movable lens groups may be configured to consist of, in order from the object side, a lens group having a negative refractive power and a lens group having a negative refractive power. In such a case, it is possible to simplify the zooming mechanism.

It should be noted that the above-mentioned preferred configurations and available configurations may be arbitrary combinations, and it is preferable to selectively adopt the configurations in accordance with required specification. According to the present embodiment, it is possible to realize a zoom lens for which reduction in size and weight is achieved with wide angle, in particular, it is possible to realize a zoom lens which has high optical performance throughout the entire zoom range by satisfactorily correcting distortion and lateral chromatic aberration on the wide-angle side. It should be noted that the "wide angle" described herein means that the maximum total angle of view at the wide-angle end is greater than 70°.

Next, numerical examples of the zoom lens of the present invention will be described.

EXAMPLE 1

A lens configuration of a zoom lens of Example 1 is shown in FIG. 1, and an illustration method thereof is as described above. Therefore, repeated description is partially omitted herein. The zoom lens of Example 1 consists of, in order from the object side, a first lens group G1 having a positive refractive power, a second lens group G2 having a positive refractive power, a third lens group G3 having a negative refractive power, a fourth lens group G4 having a negative refractive power, and a fifth lens group G5 having a positive refractive power. In these five lens groups, the distances in the direction of the optical axis between groups adjacent to each other change during zooming. The movable lens groups are the second lens group G2, the third lens group G3, and the fourth lens group G4, and the final lens group Ge is the fifth lens group G5.

The first lens group G1 consists of, in order from the object side, a first lens group front group G1a having a negative refractive power, a first lens group intermediate group G1b having a positive refractive power, and a first lens group rear group G1c having a positive refractive power. During focusing, the first lens group front group G1a remains stationary with respect to the image plane Sim, the first lens group intermediate group G1b moves, and the distance in the direction of the optical axis between the first lens group intermediate group G1b and the first lens group rear group G1c changes.

The first lens group front group G1a consists of three lenses L11 to L13 in order from the object side, the first lens group intermediate group G1b consists of one lens L14, and the first lens group rear group G1c consists of three lenses L15 to L17 in order from the object side. The second lens group G2 consists of one lens L21. The third lens group G3 consists of four lenses L31 to L34 in order from the object side. The fourth lens group G4 consists of one lens L41. The fifth lens group G5 consists of an aperture stop St and nine lenses L51 to L59 in order from the object side.

Table 1 shows basic lens data of the zoom lens of Example 1, and Table 2 shows specification and variable surface distances. In Table 1. the column of Si shows i-th (i=1, 2, 3, . . . ) surface number. The i-th surface number is attached to each of surfaces of the elements, where i sequentially increases toward the image side in a case where an object side surface of an element closest to the object side is regarded as a first surface. The column of Ri shows a radius of curvature of the i-th surface. The column of Di shows a distance on the optical axis Z between the i-th surface and an (i+1)th surface. In Table 1, the column of Ndj shows a refractive index of a j-th (j=1, 2, 3, . . . ) element at the d line (a wavelength of 587.6 nm (nanometers)), where j sequentially increases toward the image side when the surface of the element closest to the object side is regarded as the first surface. The column of vdj shows an Abbe number of the j-th element on the basis of the d line. The column of θgFj shows a partial dispersion ratio of the j-th element between the g line (a wavelength of 435.8 nm (nanometers)) and the F line (a wavelength of 486.1 nm (nanometers)). It should be noted that the partial dispersion ratio θgF between the g line and the F line of a certain lens is defined by θgF=(Ng−NF)/(NF−NC), where the refractive indexes of the lens at the g line, the F line, and the C line (a wavelength of 656.3 nm (nanometers)) are Ng, NF, and NC, respectively.

Here, reference signs of radii of curvature of surface shapes convex toward the object side are set to be positive, and reference signs of radii of curvature of surface shapes convex toward the image side are set to be negative. Table 1 additionally shows the aperture stop St and the optical member PP. In Table 1, in a place of a surface number of a surface corresponding to the aperture stop St, a term of (St) is also noted. A value at the bottom place of Di indicates a distance between the image plane Sim and the surface closest to the image side in the table. In Table 1, the variable surface distances, which are variable during zooming, are referenced by the reference signs DD[ ], and are written into places of Di, where object side surface numbers of distances are noted in [ ].

In the range of Table 2, values of the zoom ratio Zr, the focal length f of the whole system, the F number FNo., the maximum total angle of view 2ω, and the variable surface distance are based on the d line.) (°) in the place of 2ω indicates that the unit thereof is a degree. In Table 2, values in the wide-angle end state, the middle focal length state, and the telephoto end state are respectively shown in the columns labeled by WIDE, MIDDLE, and TELE. The values of Tables 1 and 2 are values in a state where the object at the infinity is in focus.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Si | Ri | Di | Ndj | vdj | θgFj |
|---|---|---|---|---|---|
| 1 | 71.81199 | 1.98483 | 1.910823 | 35.25 | 0.5822 |
| 2 | 32.04995 | 14.01276 | | | |
| 3 | −169.85281 | 1.70032 | 1.910823 | 35.25 | 0.5822 |
| 4 | 98.50747 | 10.07301 | | | |
| 5 | 64.50130 | 3.69556 | 1.808095 | 22.76 | 0.6307 |
| 6 | 117.95395 | 7.69065 | | | |
| 7 | −403.81604 | 5.00032 | 1.438750 | 94.66 | 0.5340 |
| 8 | −97.82956 | 6.60068 | | | |
| 9 | 134.88124 | 1.69910 | 1.688931 | 31.07 | 0.6004 |
| 10 | 41.15500 | 13.63281 | 1.537750 | 74.70 | 0.5394 |
| 11 | −81.84788 | 0.11921 | | | |
| 12 | 74.80796 | 4.29911 | 1.816000 | 46.62 | 0.5568 |
| 13 | 581.93071 | DD[13] | | | |
| 14 | 414.70166 | 2.98152 | 1.438750 | 94.66 | 0.5340 |
| 15 | −192.35317 | DD[15] | | | |
| 16 | 60.59836 | 1.10000 | 2.000694 | 25.46 | 0.6136 |
| 17 | 26.58276 | 6.71773 | | | |
| 18 | −41.83532 | 1.10000 | 1.592824 | 68.62 | 0.5441 |
| 19 | ∞ | 1.29967 | | | |
| 20 | ∞ | 1.11000 | 1.438750 | 94.66 | 0.5340 |
| 21 | 41.41600 | 3.79912 | 1.808095 | 22.76 | 0.6307 |
| 22 | −208.57686 | DD[22] | | | |
| 23 | −25.69507 | 1.10000 | 1.438750 | 94.66 | 0.5340 |
| 24 | −97.61823 | DD[24] | | | |
| 25(St) | ∞ | 1.55073 | | | |
| 26 | 161.82650 | 2.79382 | 1.846669 | 23.83 | 0.6190 |
| 27 | −112.24837 | 0.20018 | | | |
| 28 | 24.93850 | 8.88699 | 1.438750 | 94.66 | 0.5340 |
| 29 | −36.50700 | 1.10000 | 1.953748 | 32.32 | 0.5901 |
| 30 | 144.41888 | 7.03835 | | | |
| 31 | 202.67016 | 4.16093 | 1.805190 | 25.47 | 0.6101 |
| 32 | −45.05170 | 3.08688 | | | |
| 33 | 30.96070 | 1.10000 | 1.953748 | 32.32 | 0.5901 |
| 34 | 16.39300 | 7.70908 | 1.696797 | 55.53 | 0.5434 |
| 35 | 124.08371 | 0.24867 | | | |
| 36 | 119.27490 | 6.41000 | 1.438750 | 94.66 | 0.5340 |
| 37 | −19.73100 | 1.10000 | 1.854780 | 24.80 | 0.6123 |
| 38 | 41.19779 | 13.49915 | | | |
| 39 | 96.33050 | 3.00607 | 1.806100 | 40.93 | 0.5714 |
| 40 | −171.61879 | 0.00000 | | | |
| 41 | ∞ | 2.00000 | 1.516330 | 64.14 | 0.5353 |
| 42 | ∞ | 23.46519 | | | |

TABLE 2

Example 1

|  | WIDE | MIDDLE | TELE |
|---|---|---|---|
| Zr | 1.00 | 2.00 | 2.97 |
| f | 18.59 | 37.18 | 55.22 |
| FNo. | 2.76 | 2.77 | 2.76 |
| 2ω(°) | 78.66 | 41.18 | 28.46 |
| DD[13] | 1.73 | 10.01 | 20.86 |
| DD[15] | 1.18 | 17.31 | 18.46 |
| DD[22] | 17.24 | 4.37 | 5.04 |
| DD[24] | 25.17 | 13.62 | 0.97 |

Figure 6:
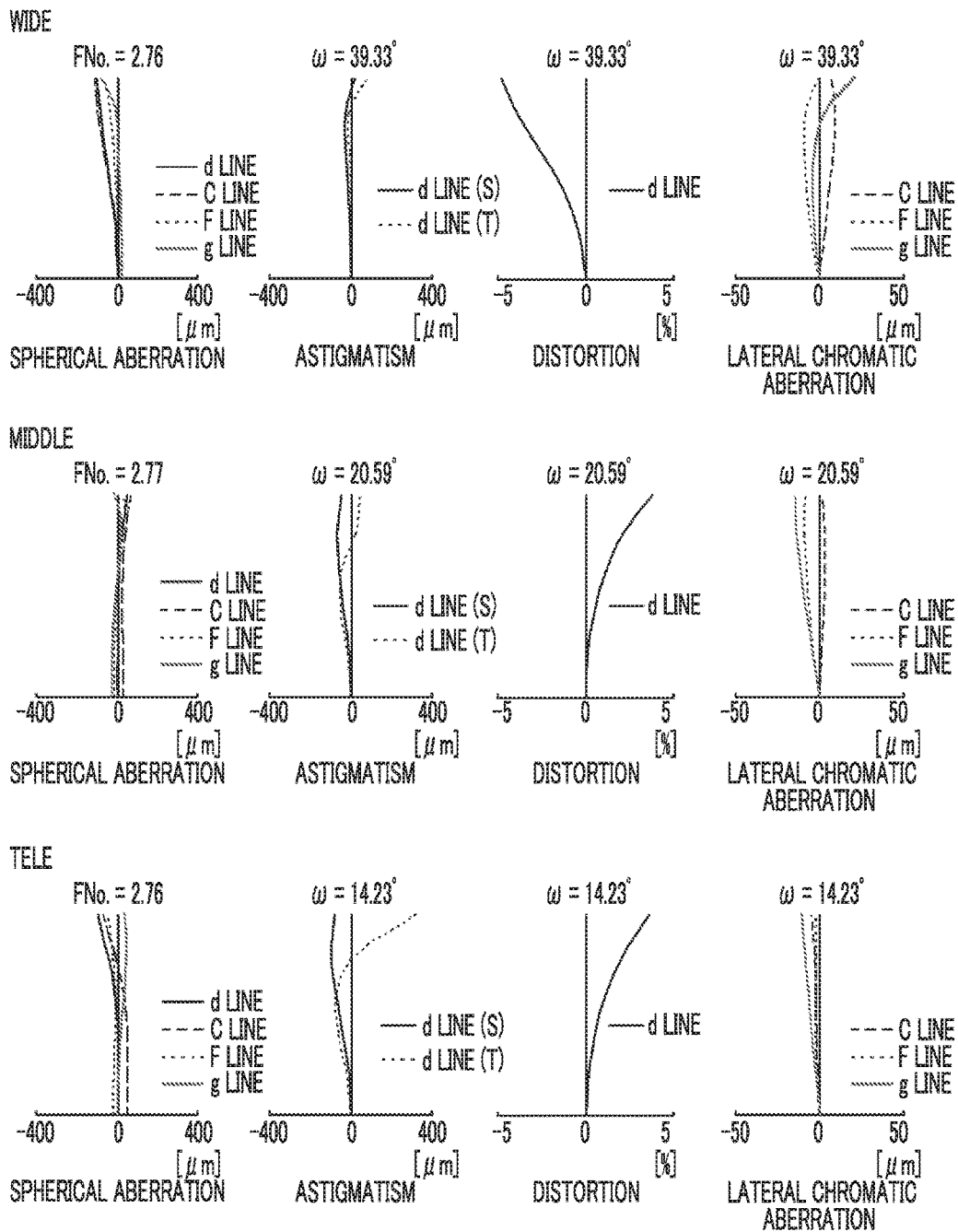
FIG. 6 is a diagram of aberrations of the zoom lens according to Example 1 of the present invention, where the upper part thereof shows the zoom lens in the wide-angle end state, the middle part thereof shows the zoom lens in the middle focal length state, the lower part thereof shows the zoom lens in the telephoto end state, and aberration diagrams of each state are spherical aberration diagram, astigmatism diagram, distortion diagram, and lateral chromatic aberration diagram in order from the left side.

FIG. 6 shows aberration diagrams in a state where an object at the infinity is brought into focus through the zoom lens of Example 1. In FIG. 6, in order from the left side, spherical aberration, astigmatism, distortion, and lateral chromatic aberration are shown. In FIG. 6, the upper part labeled by WIDE shows the zoom lens in the wide-angle end state, the middle part labeled by MIDDLE shows the zoom lens in the middle focal length state, the lower part labeled by TELE shows the zoom lens in the telephoto end state. In the spherical aberration diagram, aberrations at the d line (a wavelength of 587.6 nm (nanometers)), the C line (a wavelength of 656.3 nm (nanometers)), the F line (a wavelength of 486.1 nm (nanometers)), and the g line (a wavelength of 435.8 nm (nanometers)) are respectively indicated by the solid line, the long dashed line, the short dashed line, and the gray solid line, In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line, the F line, and the g line are respectively indicated by the long dashed line, the short dashed line, and the gray solid line. In the spherical aberration diagram, FNo. indicates an F number. In the other aberration diagrams, w indicates a half angle of view.

In the description of Example 1, reference signs, meanings, and description methods of the respective data pieces are the same as those in the following examples unless otherwise noted. Therefore, in the following description, repeated description will be omitted.

Example 2

Figure 2:
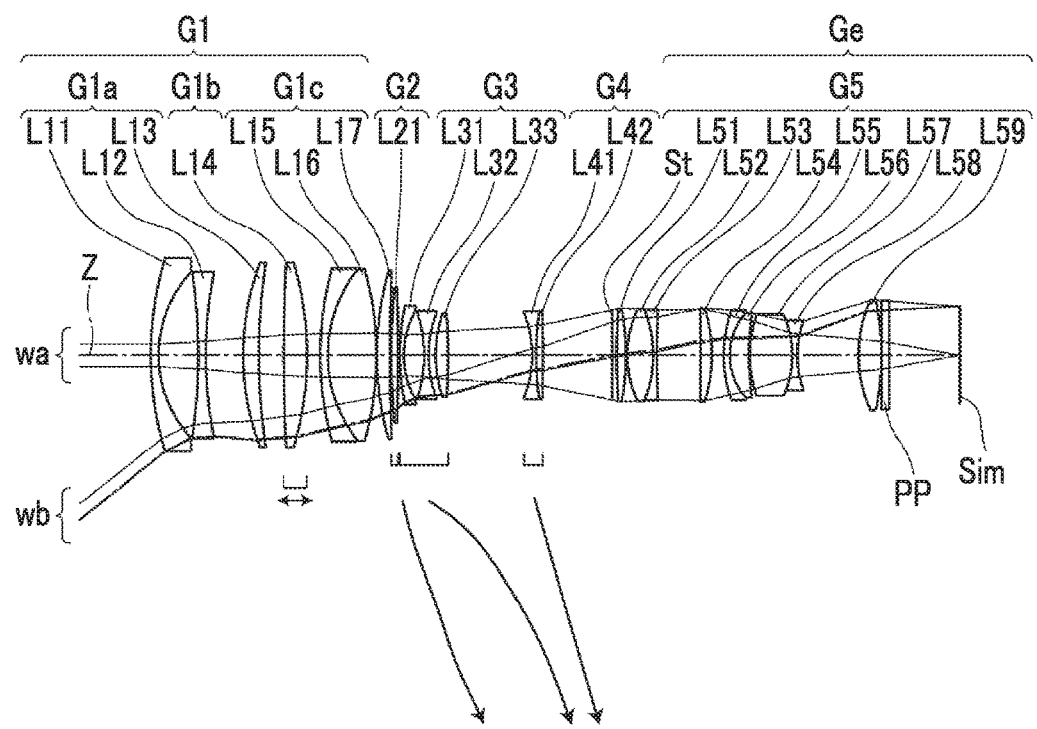
FIG. 2 is a cross-sectional view illustrating a configuration and an optical path of a zoom lens according to Example 2 of the present invention, where the upper part thereof shows the zoom lens in a wide-angle end state and the lower part thereof shows the zoom lens in a telephoto end state.
Figure 2:
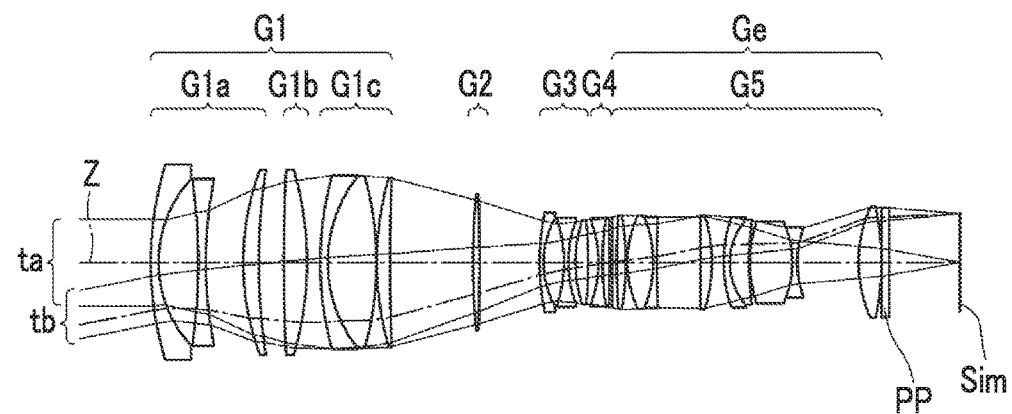

FIG. 2 shows a lens configuration and an optical path of a zoom lens of Example 2. The zoom lens of Example 2 is the same as that of Example 1 in terms of: the group configuration; the reference signs of the refractive powers of the respective lens groups; the lens groups that move during zooming; and the lens groups that move during focusing. The first lens group front group G1a consists of three lenses L11 to L13 in order from the object side, the first lens group intermediate group G1b consists of one lens L14, and the first lens group rear group G1c consists of three lenses L15 to L17 in order from the object side. The second lens group G2 consists of one lens L21. The third lens group G3 consists of three lenses L31 to L33 in order from the object side. The fourth lens group G4 consists of two lenses L41 and L42 in order from the object side. The fifth lens group G5 consists of an aperture stop St and nine lenses L51 to L59 in order from the object side.

Figure 7:
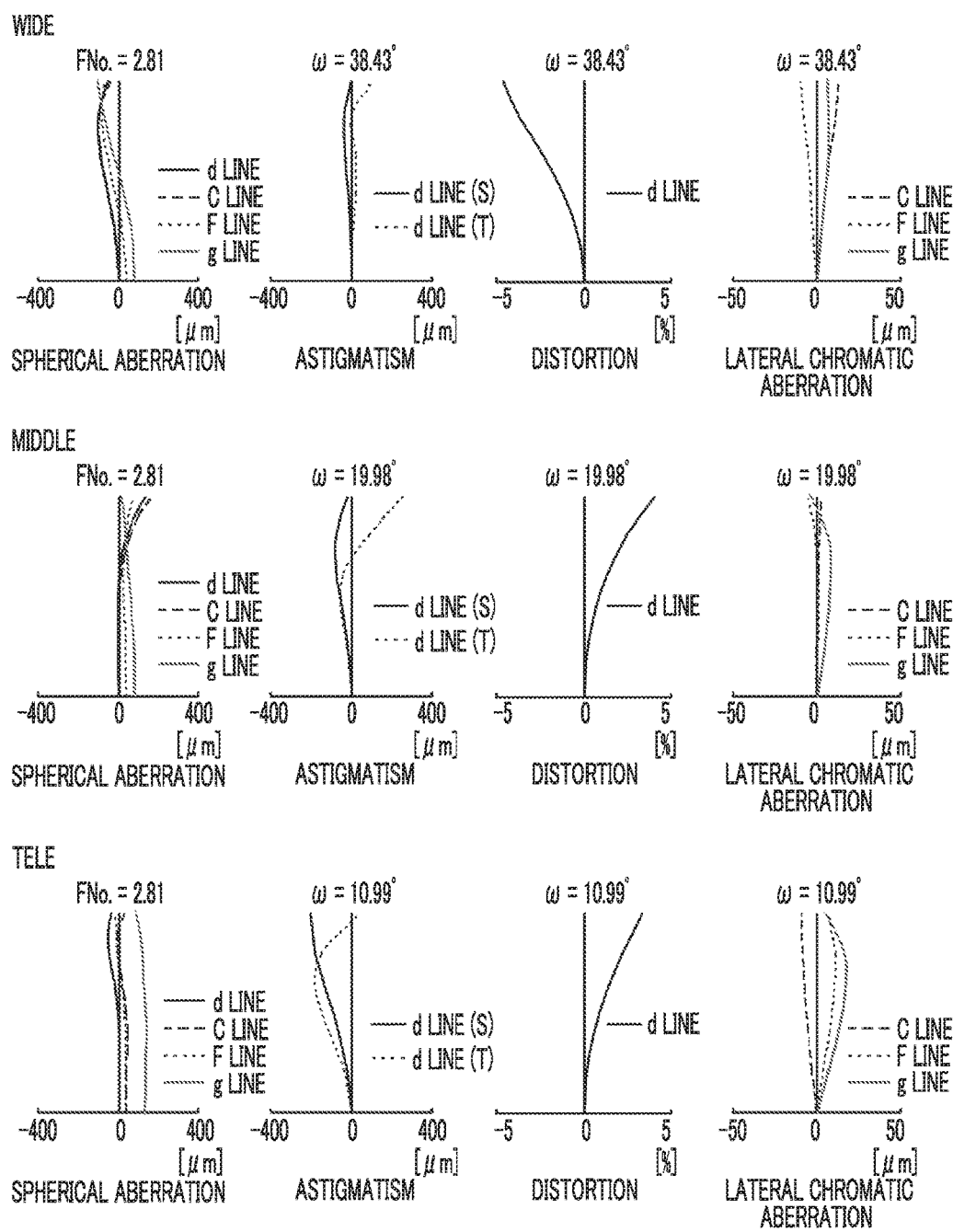
FIG. 7 is a diagram of aberrations of the zoom lens according to Example 2 of the present invention, where the upper part thereof shows the zoom lens in the wide-angle end state, the middle part thereof shows the zoom lens in the middle focal length state, the lower part thereof shows the zoom lens in the telephoto end state, and aberration diagrams of each state are spherical aberration diagram, astigmatism diagram, distortion diagram, and lateral chromatic aberration diagram in order from the left side.

Table 3 shows basic lens data of the zoom lens of Example 2, Table 4 shows specification and variable surface distances, and FIG. 7 shows aberration diagrams in a state where the object at the infinity is in focus.

TABLE 3

Example 2

| Si | Ri | Di | Ndj | νdj | θgFj |
|---|---|---|---|---|---|
| 1 | 100.49843 | 2.29978 | 1.910823 | 35.25 | 0.5822 |
| 2 | 36.60593 | 11.93997 | | | |
| 3 | −170.49497 | 2.22260 | 1.882997 | 40.76 | 0.5668 |
| 4 | 123.97991 | 11.10707 | | | |
| 5 | 78.56359 | 4.60994 | 1.758931 | 24.77 | 0.6206 |
| 6 | 178.29774 | 7.33912 | | | |
| 7 | 485.11502 | 6.97962 | 1.496999 | 81.54 | 0.5375 |
| 8 | −96.38070 | 3.93201 | | | |
| 9 | 99.29681 | 2.20205 | 1.740528 | 29.75 | 0.5996 |
| 10 | 41.15376 | 14.42472 | 1.537750 | 74.70 | 0.5394 |
| 11 | −95.75688 | 0.12000 | | | |
| 12 | 91.65753 | 3.84686 | 1.836478 | 44.96 | 0.5598 |
| 13 | 498.10287 | DD[13] | | | |
| 14 | 222.37466 | 2.00001 | 1.438750 | 94.66 | 0.5340 |
| 15 | −583.00409 | DD[15] | | | |
| 16 | 70.44263 | 1.22561 | 1.911795 | 31.76 | 0.5931 |
| 17 | 27.53490 | 5.98172 | | | |
| 18 | −40.31233 | 1.32642 | 1.496999 | 81.54 | 0.5375 |
| 19 | 35.38548 | 2.11980 | | | |
| 20 | 39.75755 | 3.72341 | 1.682061 | 29.56 | 0.6079 |
| 21 | −146.86589 | DD[21] | | | |
| 22 | −34.20530 | 1.16051 | 1.695602 | 59.05 | 0.5435 |
| 23 | 85.48479 | 2.05197 | 1.805190 | 25.47 | 0.6101 |
| 24 | −494.16216 | DD[24] | | | |
| 25(St) | ∞ | 1.39998 | | | |
| 26 | 196.89361 | 2.71797 | 1.902000 | 25.26 | 0.6166 |
| 27 | −77.71574 | 0.42870 | | | |
| 28 | 32.58302 | 7.66309 | 1.438750 | 94.66 | 0.5340 |
| 29 | −36.33941 | 1.15971 | 1.903658 | 31.31 | 0.5948 |
| 30 | 285.77887 | 12.84824 | | | |
| 31 | −1547.82841 | 3.36648 | 1.805190 | 25.47 | 0.6101 |
| 32 | −47.18327 | 3.51424 | | | |
| 33 | 39.27414 | 1.82321 | 1.854780 | 24.80 | 0.6123 |
| 34 | 19.07778 | 5.66929 | 1.695602 | 59.05 | 0.5435 |
| 35 | 86.42178 | 0.30167 | | | |
| 36 | 38.85705 | 12.74904 | 1.496999 | 81.54 | 0.5375 |
| 37 | −29.08941 | 1.47973 | 2.001003 | 29.13 | 0.5995 |
| 38 | 29.63583 | 18.40185 | | | |
| 39 | 40.01005 | 6.78196 | 1.531717 | 48.84 | 0.5631 |
| 40 | −80.05392 | 0.00000 | | | |
| 41 | ∞ | 2.30000 | 1.516330 | 64.14 | 0.5353 |
| 42 | ∞ | 21.01382 | | | |

TABLE 4

Example 2

|  | WIDE | MIDDLE | TELE |
|---|---|---|---|
| Zr | 1.00 | 2.00 | 3.77 |
| f | 19.16 | 38.32 | 72.24 |
| FNo. | 2.81 | 2.81 | 2.81 |
| 2ω(°) | 76.86 | 39.96 | 21.98 |
| DD[13] | 0.48 | 11.12 | 24.66 |
| DD[15] | 0.48 | 14.55 | 17.67 |
| DD[21] | 24.79 | 5.78 | 3.11 |
| DD[24] | 20.46 | 14.77 | 0.78 |

Example 3

Figure 3:
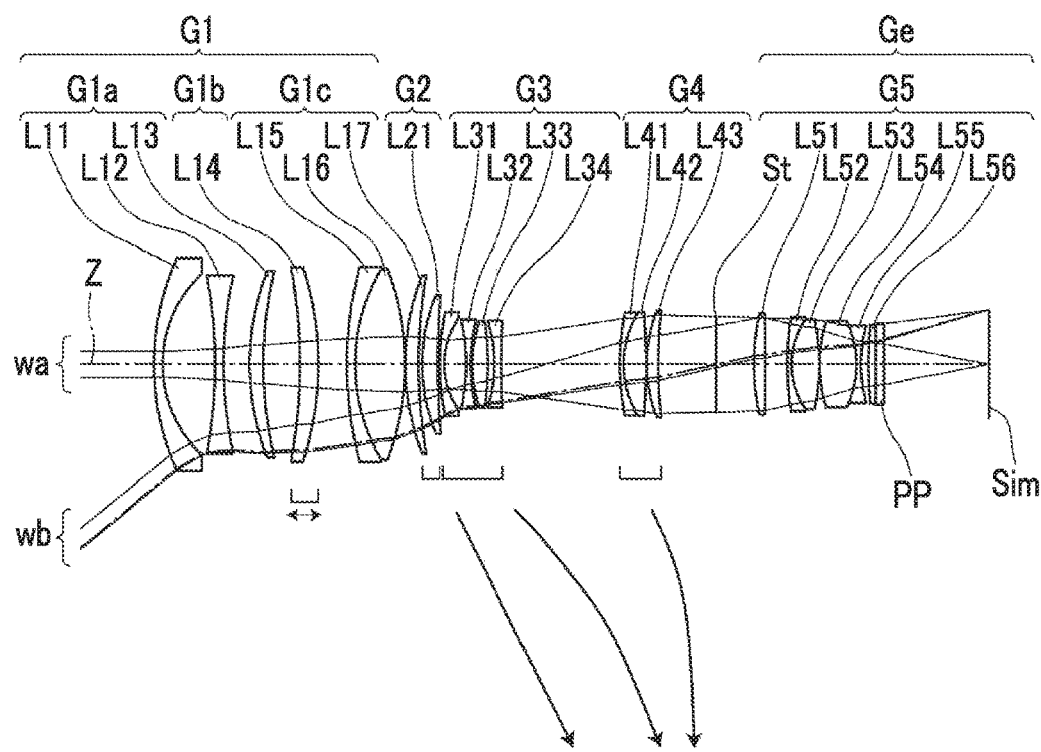
FIG. 3 is a cross-sectional view illustrating a configuration and an optical path of a zoom lens according to Example 3 of the present invention, where the upper part thereof shows the zoom lens in a wide-angle end state and the lower part thereof shows the zoom lens in a telephoto end state.
Figure 3:
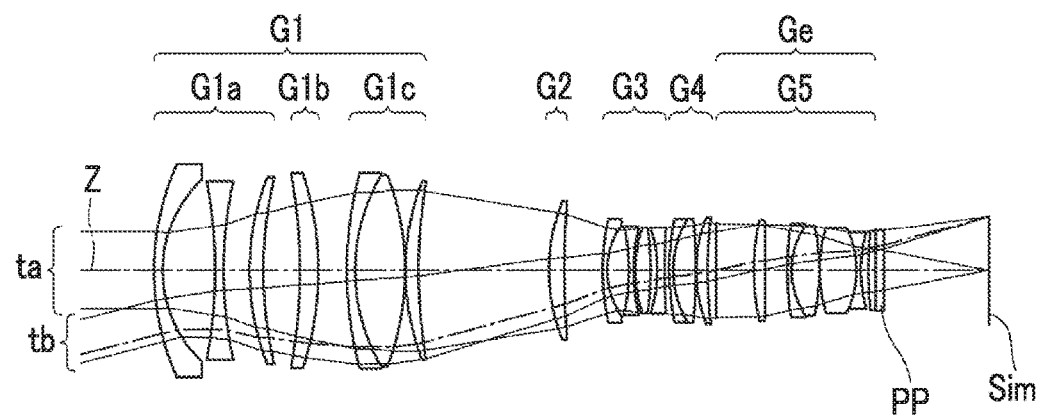

FIG. 3 shows a lens configuration and an optical path of a zoom lens of Example 3, The zoom lens of Example 3 consists of, in order from the object side, a first lens group G1 having a positive refractive power, a second lens group G2 having a positive refractive power, a third lens group G3 having a negative refractive power, a fourth lens group G4 having a positive refractive power, and a fifth lens group G5 having a positive refractive power. The first lens group G1 consists of, in order from the object side, a first lens group front group G1a, a first lens group intermediate group G1b, and a first lens group rear group G1c. The zoom lens of Example 2 is the same as that of Example 1 in terms of the lens groups that move during zooming and the lens groups that move during focusing.

The first lens group front group G1a consists of three lenses L11 to L13 in order from the object side, the first lens group intermediate group G1b consists of one lens L14, and the first lens group rear group G1c consists of three lenses L15 to L17 in order from the object side. The second lens group G2 consists of one lens L21. The third lens group G3 consists of four lenses L31 to L34 in order from the object side. The fourth lens group G4 consists of three lenses L41 to L43 in order from the object side. The fifth lens group G5 consists of an aperture stop St and six lenses L51 to L56 in order from the object side.

Figure 8:
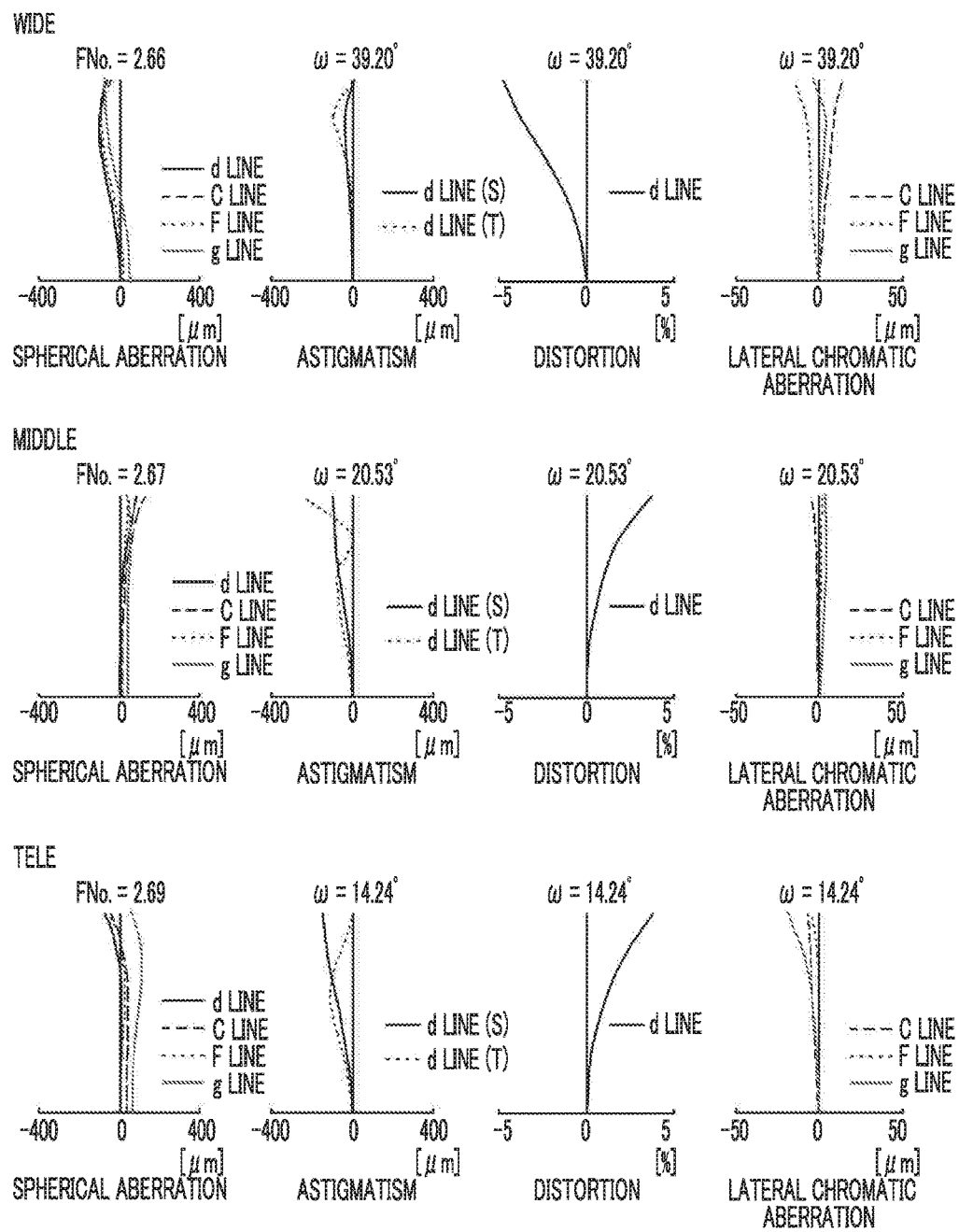
FIG. 8 is a diagram of aberrations of the zoom lens according to Example 3 of the present invention, where the upper part thereof shows the zoom lens in the wide-angle end state, the middle part thereof shows the zoom lens in the middle focal length state, the lower part thereof shows the zoom lens in the telephoto end state, and aberration diagrams of each state are spherical aberration diagram, astigmatism diagram, distortion diagram, and lateral chromatic aberration diagram in order from the left side.

Table 5 shows basic lens data of the zoom lens of Example 3, Table 6 shows specification and variable surface distances, and FIG. 8 shows aberration diagrams in a state where the object at the infinity is in focus.

TABLE 5

Example 3

| Si | Ri | Di | Ndj | vdj | θgFj |
|---|---|---|---|---|---|
| 1 | 69.90124 | 2.29914 | 1.910823 | 35.25 | 0.5822 |
| 2 | 33.77683 | 14.18047 | | | |
| 3 | −123.49399 | 2.20000 | 1.910823 | 35.25 | 0.5822 |
| 4 | 109.22144 | 6.92541 | | | |
| 5 | 68.34505 | 3.69958 | 1.887549 | 20.54 | 0.6387 |
| 6 | 109.39990 | 9.72622 | | | |
| 7 | −143.69959 | 4.94474 | 1.592824 | 68.62 | 0.5441 |
| 8 | −83.64868 | 7.56237 | | | |
| 9 | 102.22530 | 2.19910 | 1.831408 | 25.56 | 0.6121 |
| 10 | 50.57346 | 13.32096 | 1.537750 | 74.70 | 0.5394 |
| 11 | −72.18766 | 0.11910 | | | |
| 12 | 66.86857 | 3.48851 | 1.882997 | 40.76 | 0.5668 |
| 13 | 140.69287 | DD[13] | | | |
| 14 | 49.27160 | 4.14469 | 1.591906 | 68.75 | 0.5441 |
| 15 | 244.49775 | DD[15] | | | |
| 16 | 66.10591 | 1.20004 | 1.899996 | 38.00 | 0.5733 |
| 17 | 21.52241 | 5.81314 | | | |
| 18 | −50.64314 | 1.19913 | 1.592824 | 68.62 | 0.5441 |
| 19 | 48.62843 | 0.44273 | | | |
| 20 | 35.75799 | 4.10171 | 1.900000 | 28.97 | 0.6024 |
| 21 | −78.36956 | 1.77775 | | | |
| 22 | −37.79989 | 2.00055 | 1.825373 | 46.55 | 0.5538 |
| 23 | 227.10414 | DD[23] | | | |
| 24 | 69.33326 | 1.05061 | 1.903658 | 31.31 | 0.5948 |
| 25 | 27.03898 | 5.98164 | 1.438750 | 94.66 | 0.5340 |
| 26 | −156.72089 | 0.15000 | | | |
| 27 | 39.24450 | 3.04102 | 1.846669 | 23.83 | 0.6190 |
| 28 | 122.27784 | DD[28] | | | |
| 29(St) | ∞ | 10.00000 | | | |
| 30 | 60.37973 | 3.05899 | 1.851500 | 40.78 | 0.5696 |
| 31 | −534.13118 | 6.04331 | | | |
| 32 | 82.30479 | 1.09910 | 1.698947 | 30.13 | 0.6030 |
| 33 | 21.04331 | 7.37819 | 1.537750 | 74.70 | 0.5394 |
| 34 | −56.40670 | 0.12000 | | | |
| 35 | 39.87246 | 9.79328 | 1.438750 | 94.66 | 0.5340 |
| 36 | −26.18031 | 1.20003 | 1.953748 | 32.32 | 0.5901 |
| 37 | 38.73573 | 2.04078 | | | |
| 38 | 136.05682 | 2.00022 | 1.846669 | 23.83 | 0.6190 |
| 39 | −298.83333 | 0.00000 | | | |
| 40 | ∞ | 2.30000 | 1.516330 | 64.14 | 0.5353 |
| 41 | ∞ | 28.03316 | | | |

TABLE 6

Example 3

| | WIDE | MIDDLE | TELE |
|---|---|---|---|
| Zr | 1.00 | 2.00 | 2.95 |
| f | 18.67 | 37.34 | 55.07 |
| FNo. | 2.66 | 2.67 | 2.69 |
| 2ω(°) | 78.40 | 41.06 | 28.48 |
| DD[13] | 0.98 | 19.02 | 34.64 |
| DD[15] | 0.51 | 9.94 | 10.23 |
| DD[23] | 31.37 | 14.71 | 1.18 |
| DD[28] | 15.52 | 4.70 | 2.32 |

Example 4

Figure 4:
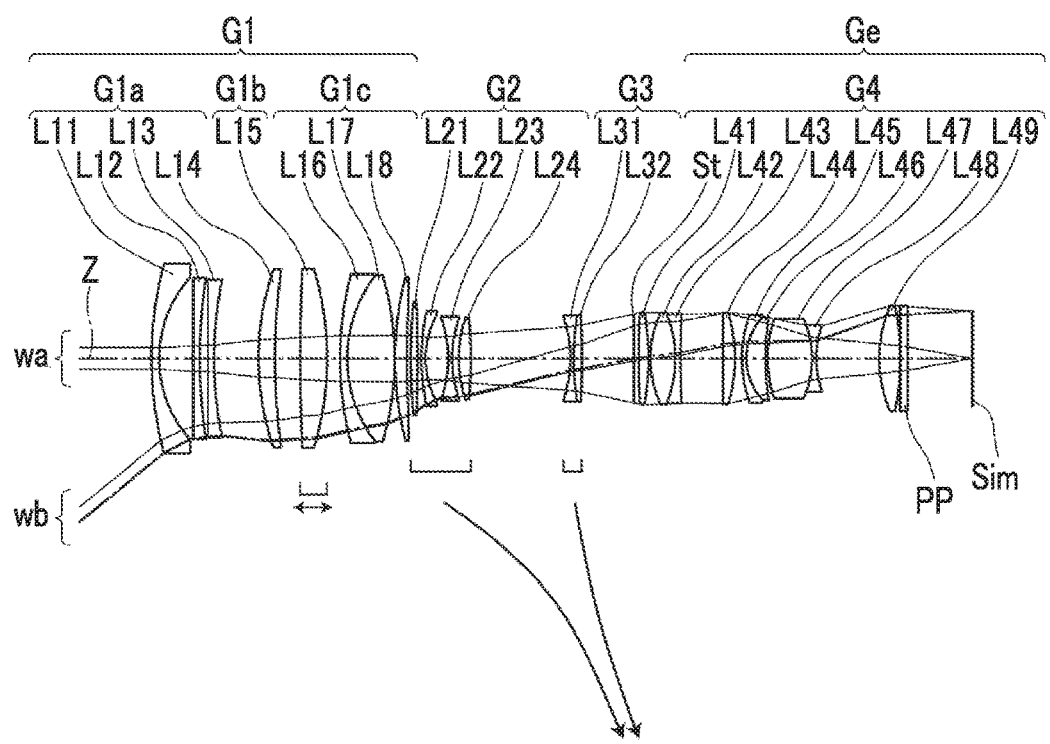
FIG. 4 is a cross-sectional view illustrating a configuration and an optical path of a zoom lens according to Example 4 of the present invention, where the upper part thereof shows the zoom lens in a wide-angle end state and the lower part, thereof shows the zoom lens in a telephoto end state.
Figure 4:
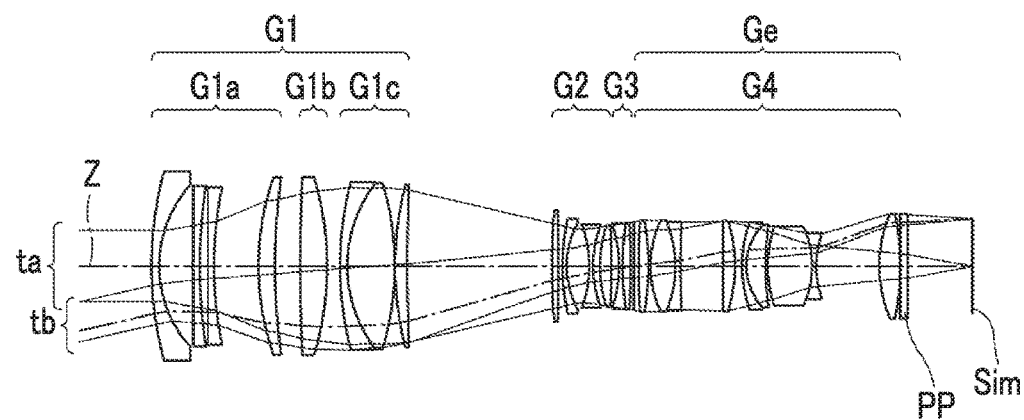

FIG. 4 shows a lens configuration and an optical path of a zoom lens of Example 4, The zoom lens of Example 4 consists of, in order from the object side, a first lens group G1 having a positive refractive power, a second lens group G2 having a negative refractive power, a third lens group G3 having a negative refractive power, and a fourth lens group G4 having a positive refractive power. The movable lens groups are the second lens group G2 and the third lens group G3, and the final lens group Ge is the fourth lens group G4. The first lens group G1 consists of, in order from the object side, a first lens group front group G1a, a first lens group intermediate group G1b, and a first lens group rear group G1c. The lens groups that move during focusing in the zoom lens of Example 4 are the same as those in Example 1.

The first lens group front group G1a consists of four lenses L11 to L14 in order from the object side, the first lens group intermediate group G1b consists of one lens L15, and the first lens group rear group G1c consists of three lenses L16 to L18 in order from the object side. The second lens group G2 consists of four lenses L21 to L24. The third lens group G3 consists of two lenses L31 and L32 in order from the object side. The fourth lens group G4 consists of an aperture stop St and nine lenses L41 to L49 in order from the object side.

Figure 9:
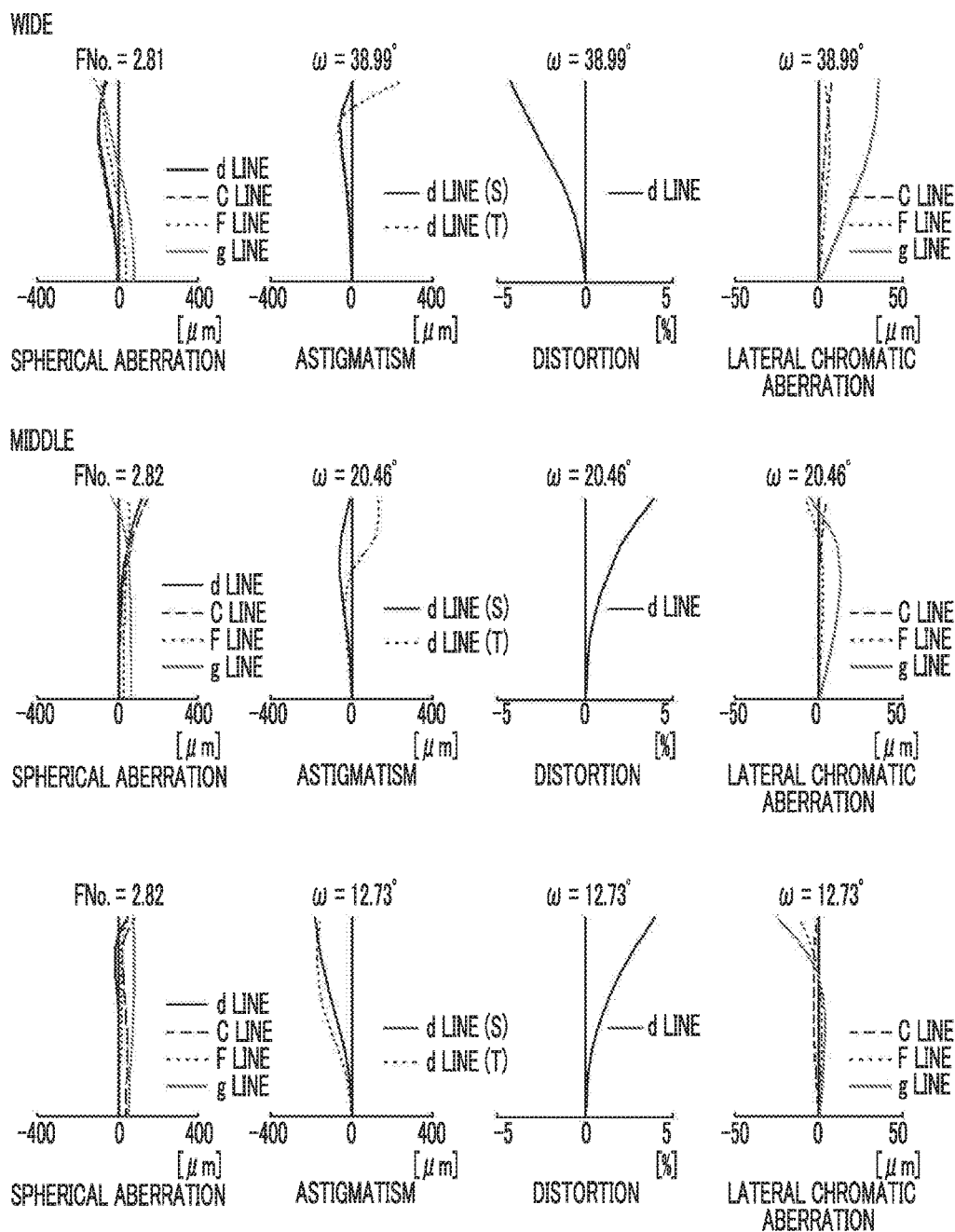
FIG. 9 is a diagram of aberrations of the zoom lens according to Example 4 of the present invention, where the upper part thereof shows the zoom lens in the wide-angle end state, the middle part thereof shows the zoom lens in the middle focal length state, the lower part thereof shows the zoom lens in the telephoto end state, and aberration diagrams of each state are spherical aberration diagram, astigmatism diagram, distortion diagram, and lateral chromatic aberration diagram in order from the left side.

Table 7 shows basic lens data of the zoom lens of Example 4, Table 8 shows specification and variable surface distances, and FIG. 9 shows aberration diagrams in a state where the object at the infinity is in focus.

TABLE 7

Example 4

| Si | Ri | Di | Ndj | vdj | θgFj |
|---|---|---|---|---|---|
| 1 | 112.43953 | 2.30062 | 1.910823 | 35.25 | 0.5822 |
| 2 | 37.15737 | 10.39813 | | | |
| 3 | 2494.32477 | 2.00000 | 1.882997 | 40.76 | 0.5668 |
| 4 | 155.38268 | 2.58417 | | | |
| 5 | −2217.55646 | 2.00008 | 1.882997 | 40.76 | 0.5668 |
| 6 | 117.43073 | 13.60065 | | | |
| 7 | 83.16796 | 5.02071 | 1.793299 | 23.36 | 0.6277 |
| 8 | 192.35258 | 7.70244 | | | |
| 9 | 503.16683 | 8.24157 | 1.496999 | 81.54 | 0.5375 |
| 10 | −95.63588 | 3.95832 | | | |
| 11 | 101.76529 | 2.20094 | 1.760622 | 28.79 | 0.6023 |
| 12 | 41.97919 | 14.50777 | 1.537750 | 74.70 | 0.5394 |
| 13 | −89.73156 | 0.11910 | | | |
| 14 | 100.87282 | 3.78368 | 1.781034 | 49.97 | 0.5515 |
| 15 | 654.08914 | DD[15] | | | |
| 16 | 201.75014 | 2.00051 | 1.438750 | 94.66 | 0.5340 |
| 17 | −700.43262 | 1.25032 | | | |
| 18 | 67.21353 | 1.24795 | 1.875280 | 40.47 | 0.5672 |
| 19 | 27.68110 | 6.90374 | | | |
| 20 | −37.48788 | 1.20088 | 1.496999 | 81.54 | 0.5375 |

TABLE 7-continued

Example 4

| Si | Ri | Di | Ndj | vdj | θgFj |
|---|---|---|---|---|---|
| 21 | 35.43240 | 2.07785 | | | |
| 22 | 39.74699 | 3.62061 | 1.644329 | 31.99 | 0.6017 |
| 23 | −159.48038 | DD[23] | | | |
| 24 | −39.71850 | 1.06033 | 1.695602 | 59.05 | 0.5435 |
| 25 | 81.92993 | 2.46222 | 1.805190 | 25.47 | 0.6101 |
| 26 | −356.56419 | DD[26] | | | |
| 27(St) | ∞ | 1.43128 | | | |
| 28 | 204.74212 | 3.07260 | 1.902000 | 25.26 | 0.6166 |
| 29 | −78.32369 | 0.52736 | | | |
| 30 | 32.48807 | 7.65784 | 1.438750 | 94.66 | 0.5340 |
| 31 | −36.14356 | 1.54834 | 1.903658 | 31.31 | 0.5948 |
| 32 | 302.14321 | 13.04772 | | | |
| 33 | −1946.84959 | 3.61045 | 1.805190 | 25.47 | 0.6101 |
| 34 | −47.15069 | 2.19422 | | | |
| 35 | 39.86874 | 1.32764 | 1.854780 | 24.80 | 0.6123 |
| 36 | 18.97541 | 5.87293 | 1.695602 | 59.05 | 0.5435 |
| 37 | 85.79223 | 0.64976 | | | |
| 38 | 38.84014 | 13.76193 | 1.496999 | 81.54 | 0.5375 |
| 39 | −29.14625 | 1.25153 | 2.001003 | 29.13 | 0.5995 |
| 40 | 29.56126 | 19.54278 | | | |
| 41 | 41.38671 | 6.40165 | 1.531717 | 48.84 | 0.5631 |
| 42 | −82.26400 | 0.00000 | | | |
| 43 | ∞ | 2.30000 | 1.516330 | 64.14 | 0.5353 |
| 44 | ∞ | 19.77374 | | | |

TABLE 8

Example 4

| | WIDE | MIDDLE | TELE |
|---|---|---|---|
| Zr | 1.00 | 2.00 | 3.30 |
| f | 18.70 | 37.40 | 61.71 |
| FNo. | 2.81 | 2.82 | 2.82 |
| 2ω(°) | 77.98 | 40.92 | 25.46 |
| DD[15] | 1.03 | 29.60 | 44.10 |
| DD[23] | 30.41 | 5.96 | 2.23 |
| DD[26] | 15.90 | 11.78 | 1.01 |

Example 5

Figure 5:
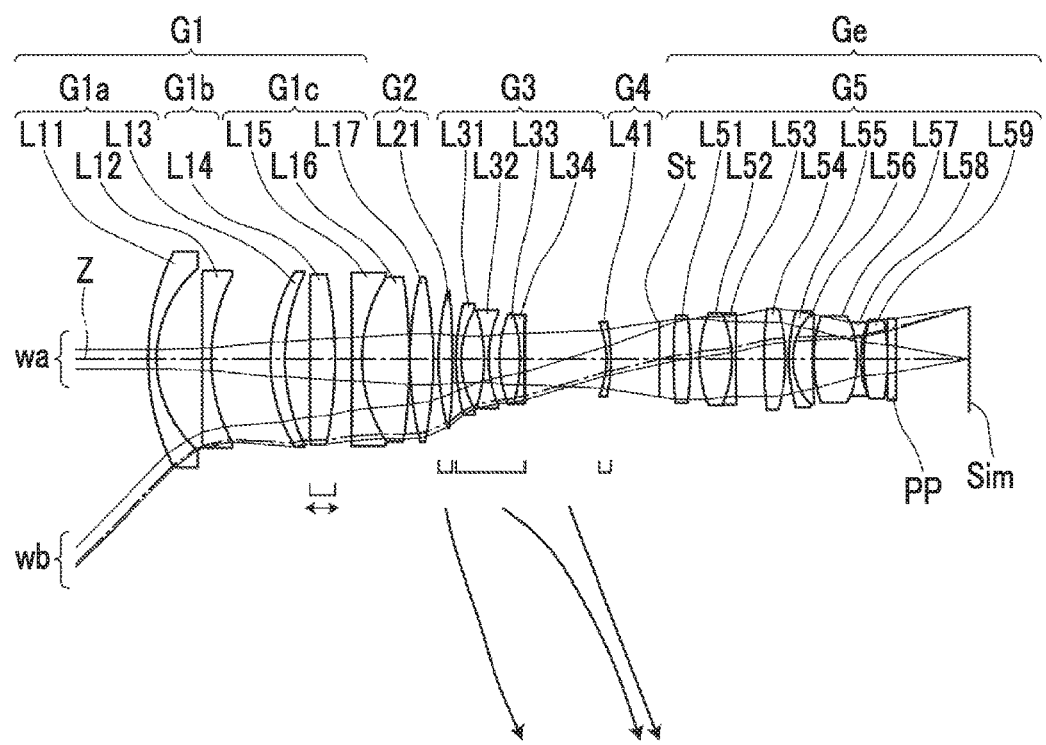
FIG. 5 is a cross-sectional view illustrating a configuration and an optical path of a zoom lens according to Example 5 of the present invention, where the upper part thereof shows the zoom lens in a wide-angle end state and the lower part thereof shows the zoom lens in a telephoto end state.
Figure 5:
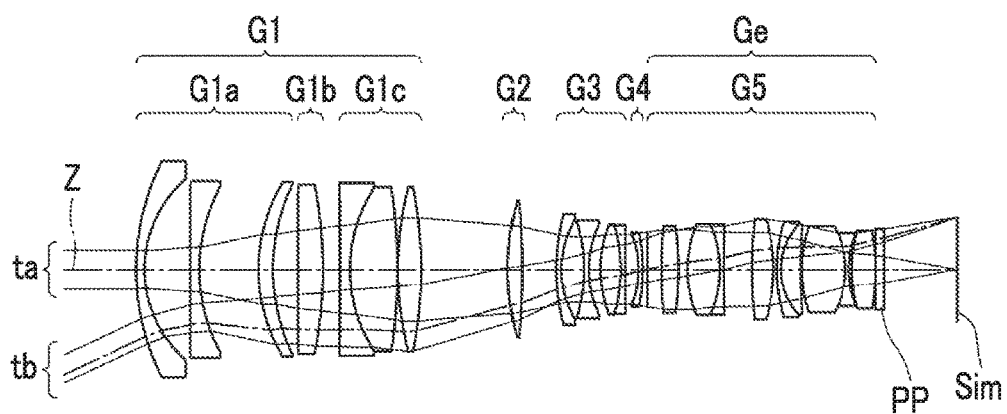

FIG. 5 shows a lens configuration and an optical path of a zoom lens of Example 5. The zoom lens of Example 5 is the same as that of Example 1 in terms of the group configuration; the reference signs of the refractive powers of the respective lens groups; the lens groups that moves during zooming; and the lens groups that moves during focusing. The first lens group front group G1a consists of three lenses to L13 in order from the object side, the first lens group intermediate group G1b consists of one lens L14, and the first lens group rear group G1c consists of three lenses L15 to L17 in order from the object side. The second lens group G2 consists of one lens L21. The third lens group G3 consists of four lenses L31 to L34 in order from the object side. The fourth lens group G4 consists of one lens L41. The fifth lens group G5 consists of an aperture stop St and nine lenses L51 to L59 in order from the object side.

Figure 10:
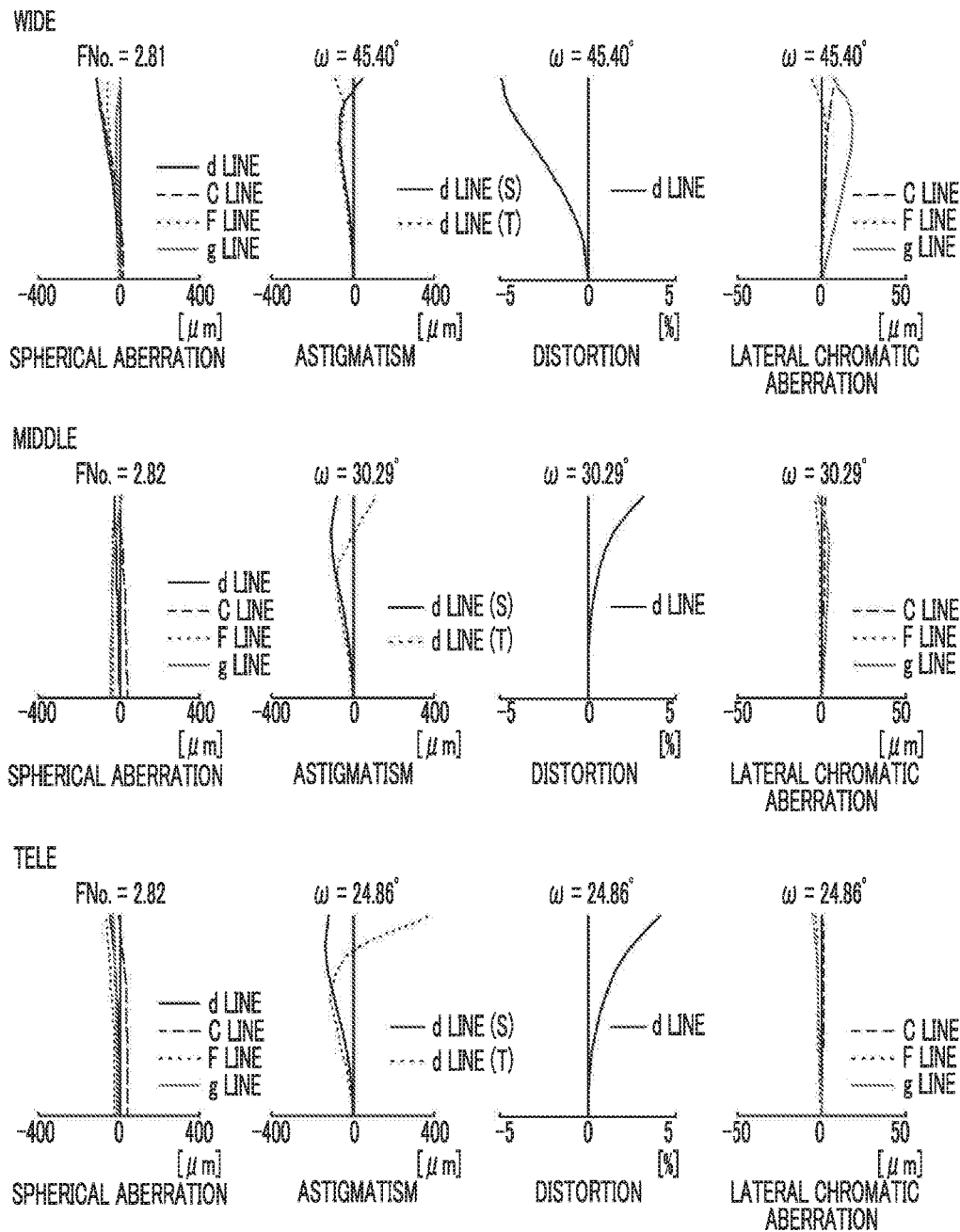
FIG. 10 is a diagram of aberrations of the zoom lens according to Example 5 of the present invention, where the upper part thereof shows the zoom lens in the wide-angle end state, the middle part thereof shows the zoom lens in the middle focal length state, the lower part thereof shows the zoom lens in the telephoto end state, and aberration diagrams of each state are spherical aberration diagram, astigmatism diagram, distortion diagram, and lateral chromatic aberration diagram in order from the left side.

Table 9 shows basic lens data of the zoom lens of Example 5, Table 10 shows specification and variable surface distances, and FIG. 10 shows aberration diagrams in a state where the object at the infinity is in focus.

TABLE 9

Example 5

| Si | Ri | Di | Ndj | vdj | θgFj |
|---|---|---|---|---|---|
| 1 | 66.62031 | 2.30005 | 1.949521 | 33.05 | 0.5882 |
| 2 | 33.55709 | 12.80096 | | | |
| 3 | 17774.08323 | 2.55145 | 1.949953 | 33.00 | 0.5883 |
| 4 | 48.77444 | 16.38648 | | | |
| 5 | 47.25809 | 4.00083 | 1.900321 | 20.25 | 0.6404 |
| 6 | 54.64595 | 6.88748 | | | |
| 7 | 6086.25376 | 6.91509 | 1.498133 | 81.35 | 0.5375 |
| 8 | −121.03277 | 4.71587 | | | |
| 9 | −1992.16137 | 2.76982 | 1.727392 | 30.22 | 0.5983 |
| 10 | 41.84100 | 13.12012 | 1.496408 | 83.04 | 0.5371 |
| 11 | −157.26286 | 0.12018 | | | |
| 12 | 91.22552 | 6.43720 | 1.849215 | 43.87 | 0.5635 |
| 13 | −117.22381 | DD[13] | | | |
| 14 | 73.41170 | 3.84485 | 1.592824 | 68.62 | 0.5441 |
| 15 | −221.58782 | DD[15] | | | |
| 16 | 60.15039 | 1.40000 | 1.884426 | 39.56 | 0.5694 |
| 17 | 27.32240 | 6.27678 | | | |
| 18 | −44.86932 | 1.32764 | 1.438750 | 94.66 | 0.5340 |
| 19 | 29.79551 | 3.20898 | | | |
| 20 | 33.82389 | 5.61024 | 1.592701 | 35.31 | 0.5934 |
| 21 | −44.07330 | 1.18168 | 1.592824 | 68.62 | 0.5441 |
| 22 | 560.27952 | DD[22] | | | |
| 23 | −26.17302 | 1.15036 | 1.743039 | 46.08 | 0.5611 |
| 24 | −50.26395 | DD[24] | | | |
| 25(St) | ∞ | 3.89485 | | | |
| 26 | 168.20262 | 4.68647 | 1.893976 | 22.43 | 0.6306 |
| 27 | −89.33131 | 2.51678 | | | |
| 28 | 33.85867 | 8.90299 | 1.496999 | 81.54 | 0.5375 |
| 29 | −31.74252 | 1.10794 | 1.923069 | 35.24 | 0.5834 |
| 30 | 350.07661 | 7.85137 | | | |
| 31 | 143.67744 | 5.98992 | 1.750932 | 43.62 | 0.5661 |
| 32 | −47.84735 | 1.00000 | | | |
| 33 | 45.68984 | 1.10099 | 1.953748 | 32.32 | 0.5901 |
| 34 | 18.23027 | 5.54860 | 1.753938 | 52.44 | 0.5476 |
| 35 | 179.72572 | 0.31160 | | | |
| 36 | 37.98016 | 12.14872 | 1.438750 | 94.66 | 0.5340 |
| 37 | −24.96656 | 1.01177 | 2.001003 | 29.13 | 0.5995 |
| 38 | 26.69269 | 0.83583 | | | |
| 39 | 39.93458 | 6.64945 | 1.473253 | 62.40 | 0.5363 |
| 40 | −57.67390 | 0.00000 | | | |
| 41 | ∞ | 2.30000 | 1.516330 | 64.14 | 0.5353 |
| 42 | ∞ | 20.23794 | | | |

TABLE 10

Example 5

| | WIDE | MIDDLE | TELE |
|---|---|---|---|
| Zr | 1.00 | 1.60 | 2.00 |
| f | 15.04 | 24.06 | 30.07 |
| FNo. | 2.81 | 2.82 | 2.82 |
| 2ω(°) | 90.80 | 60.58 | 49.72 |
| DD[13] | 1.50 | 16.45 | 24.10 |
| DD[15] | 1.03 | 7.29 | 9.42 |
| DD[22] | 22.58 | 8.21 | 3.77 |
| DD[24] | 13.48 | 6.65 | 1.30 |

Table 11 shows values corresponding to the conditional expressions (1) to (6) of the zoom lenses of Examples 1 to 5. The values shown in Table 11 are based on the d line.

TABLE 11

| Expression Number | | Example 1 | Example 2 | Example 3 | Example 4 | Example 5 |
|---|---|---|---|---|---|---|
| (1) | Naven | 1.911 | 1.897 | 1.911 | 1.892 | 1.950 |
| (2) | f1c/f1a | −1.41 | −1.45 | −1.54 | −1.62 | −2.17 |
| (3) | vaven − vavep | 12.49 | 13.24 | 14.71 | 15.56 | 12.77 |

TABLE 11-continued

| Expression Number | | Example 1 | Example 2 | Example 3 | Example 4 | Example 5 |
|---|---|---|---|---|---|---|
| (4) | (R1 + R2)/(R1 − R2) | 2.61 | 2.15 | 2.87 | 1.99 | 3.03 |
| (5) | fl/fla | −1.29 | −1.15 | −1.69 | −1.14 | −2.10 |
| (6) | fla/flb | −0.14 | −0.28 | −0.12 | −0.26 | −0.13 |

As can be seen from the above-mentioned data, each of the zoom lenses of Examples 1 to 5 is configured as a wide angle zoom lens to have a total angle of view of 75° or more at the wide-angle end. Thereby, reduction in weight and size is achieved, aberrations are satisfactorily corrected, and high optical performance is achieved.

Figure 11:
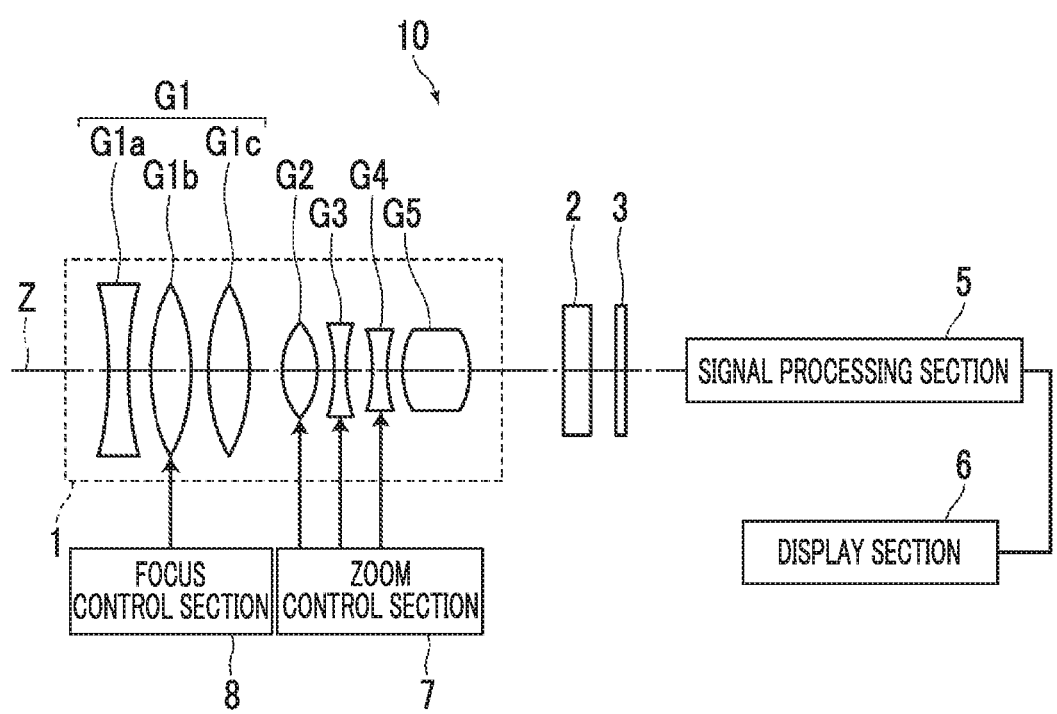
FIG. 11 is a schematic configuration diagram of an imaging apparatus according to an embodiment of the present invention.

Next, an imaging apparatus according to an embodiment of the present invention will be described. FIG. 11 is a schematic configuration diagram of an imaging apparatus 10 using the zoom lens 1 according to the embodiment of the present invention as an example of an imaging apparatus of an embodiment of the present invention. Examples of the imaging apparatus 10 include a movie imaging camera, a broadcast camera, a digital camera, a video camera, a surveillance camera, and the like.

The imaging apparatus 10 comprises a zoom lens 1, a filter 2 which is disposed on the image side of the zoom lens 1, and an imaging element 3 which is disposed on the image side of the filter 2. FIG. 11 schematically shows the first lens group front group G1a, the first lens group intermediate group G1b the first lens group rear group G1c, and the second to fifth lens groups G2 to G5 included in the zoom lens 1. However, the number of lens groups included in the zoom lens 1 of FIG. 11 is an example, and the imaging apparatus of the present invention can be composed of a number of lens groups different from that in the example of FIG. 11.

The imaging element 3 captures an image of a subject, which is formed through the zoom lens 1, and converts the image into an electrical signal. For example, charge coupled device (CCD), complementary metal oxide semiconductor (CMOS), or the like may be used. The imaging element 3 is disposed such that the imaging surface thereof is coplanar with the image plane of the zoom lens 1.

The imaging apparatus 10 also comprises a signal processing section 5 which performs calculation processing on an output signal from the imaging element 3, a display section 6 which displays an image formed by the signal processing section 5, a zoom control section 7 which controls zooming of the zoom lens 1, and a focus control section 8 which controls focusing of the zoom lens 1. It should be noted that FIG. 11 shows only one imaging element 3, but the imaging apparatus of the present invention is not limited to this, and may be a so-called three-plate imaging device having three imaging elements.

The present invention has been hitherto described through embodiments and examples, but the present invention is not limited to the above-mentioned embodiments and examples, and may be modified into various forms. For example, values such as the radius of curvature, the surface distance, the refractive index, and the Abbe number of each lens are not limited to the values shown in the numerical examples, and different values may be used therefor.

What is claimed is:

1. A zoom lens consisting of, in order from an object side:
a first lens group that has a positive refractive power and remains stationary with respect to an image plane during zooming;
a plurality of movable lens groups that move by changing distances in a direction of an optical axis between groups adjacent to each other during zooming; and
a final lens group that has positive refractive power and remains stationary with respect to the image plane during zooming,
wherein the first lens group consists of, in order from the object side, a first lens group front group that has a negative refractive power and remains stationary with respect to the image plane during focusing, a first lens group intermediate group that has a positive refractive power and moves in the direction of the optical axis during focusing, and a first lens group rear group that is set such that a distance in the direction of the optical axis between the first lens group rear group and the first lens group intermediate group changes during focusing and has a positive refractive power,
wherein the first lens group front group has, successively in order from a position closest to the object side, a negative meniscus lens that is concave toward an image side, and a negative lens,
wherein Conditional Expression (1) is satisfied, $$1.84 < Naven \quad (1),$$

where Naven is an average value of refractive indices of negative lenses in the first lens group front group at a d line.

2. The zoom lens according to claim 1, wherein Conditional Expression (2) is satisfied, $$-3 < flc/fla < -1.25 \quad (2),$$

where flc is a focal length of the first lens group rear group, and
fla is a focal length of the first lens group front group.

3. The zoom lens according to claim 1,
wherein the first lens group front group has a positive lens at a position closest to the image side, and
wherein Conditional Expression (3) is satisfied, $$10 < vaven - vavep < 20 \quad (3),$$

where vaven is an average value of Abbe numbers of the negative lenses in the first lens group front group at the d line, and
vavep is an average value of Abbe numbers of positive lenses in the first lens group front group at the d line.

4. The zoom lens according to claim 1, wherein Conditional Expression (4) is satisfied, $$1.5 < (R1+R2)/(R1-R2) < 3.5 \quad (4),$$

where R1 is a radius of curvature of an object side surface of the negative meniscus lens closest to the object side in the first lens group front group, and
R2 is a radius of curvature of an image side surface of the negative meniscus lens closest to the object side in the first lens group front group.

5. The zoom lens according to claim 1, wherein Conditional Expression (5) is satisfied, $$-2.5 < fl/fla < -1.0 \quad (5),$$

where fl is a focal length of the first lens group in a state where the object at infinity is in focus, and
fla is a focal length of the first lens group front group.

6. The zoom lens according to claim 1, wherein Conditional Expression (6) is satisfied, $$-0.4 < fla/flb < -0.1 \qquad (6)$$

where fla is a focal length of the first lens group front group, and flb is a focal length of the first lens group intermediate group.

7. The zoom lens according to claim 1, wherein the first lens group front group consists of, in order from the object side, a negative meniscus lens that is concave toward the image side, a negative lens, and a positive lens.

8. The zoom lens according to claim 1, wherein in the plurality of movable lens groups, a movable lens group closest to the object side has a positive refractive power.

9. The zoom lens according to claim 1, wherein the first lens group rear group consists of, in order from the object side, a cemented lens which is formed by cementing a negative lens and a positive lens in order from the object side, and a positive lens.

10. The zoom lens according to claim 1, wherein in the plurality of movable lens groups, a movable lens group closest to the image side has a negative refractive power.

11. The zoom lens according to claim 10, wherein the plurality of movable lens groups consists of, in order from the object side, a lens group having a positive refractive power, a lens group having a negative refractive power, and a lens group having a negative refractive power.

12. The zoom lens according to claim 1, wherein in the plurality of movable lens groups, a movable lens group closest to the image side has a positive refractive power.

13. The zoom lens according to claim 12, wherein the plurality of movable lens groups consists of, in order from the object side, a lens group having a positive refractive power, a lens group having a negative refractive power, and a lens group having a positive refractive power.

14. The zoom lens according to claim 1, wherein Conditional Expression (1-1) is satisfied $$1.85 < Naven < 1.96 \qquad (1\text{-}1).$$

15. The zoom lens according to claim 2, wherein Conditional Expression (2-1) is satisfied $$-2.5 < flc/fla < -1.35 \qquad (2\text{-}1).$$

16. The zoom lens according to claim 3, wherein Conditional Expression (3-1) is satisfied $$11 < vaven-vavep < 18 \qquad (3\text{-}1).$$

17. The zoom lens according to claim 4, wherein Conditional Expression (4-1) is satisfied $$1.8 < (R1+R2)/(R1-R2) < 3.3 \qquad (4\text{-}1).$$

18. The zoom lens according to claim 5, wherein Conditional Expression (5-1) is satisfied $$-2.2 < fl/fla < -1.1 \qquad (5\text{-}1).$$

19. The zoom lens according to claim 6, wherein Conditional Expression (6-1) is satisfied $$-0.35 < fla/flb < -0.11 \qquad (6\text{-}1).$$

20. An imaging apparatus comprising the zoom lens according to claim 1.

\* \* \* \* \*